United States Patent Office 2,978,444
Patented Apr. 4, 1961

2,978,444
POLYPEPTIDES AND PROCESS OF PREPARING SAME

Robert Schwyzer and Beat Iselin, Riehen, Heini Kappeler, Birsfelden, Werner Rittel, Basel, and Bernhard Riniker, Birsfelden, Switzerland, assignors to Ciba Pharmaceutical Products Inc., Summit, N.J.

No Drawing. Filed Aug. 29, 1957, Ser. No. 680,904

Claims priority, application Switzerland Sept. 6, 1956

15 Claims. (Cl. 260—112)

The present invention relates to the production of octapeptides having the action of hypertensin. As is known, hypertensin is a hormone having the action of increasing the blood pressure, which was first obtained from bovine blood. Investigation of the constitution of hypertensin has shown that it is a linear decapeptide having the amino-acid sequence L-asparaginic acid, L-arginine, L-valine, L-tyrosine, L-valine, L-histidine, L-proline, L-phenylalanine, L-histidine, L-leucine. In the series two further hypertensins have been found, namely hypertensin I which occurs in equine blood and contains instead of the radical of the fifth amino-acid (valine) the radical of iso-leucine, and hypertensin II which is an octapeptide of similar structure to hypertensin I, but does not contain the two final amino-acid radicals.

The present invention is based on the observation that octapeptides having the amino-acid sequence L-asparagine, L-$\alpha$-amino-(amino-lower alkyl)-acetic acid, L-$\alpha$-amino-lower alkyl acetic acid, L-tyrosine, L-$\alpha$-amino-lower alkyl acetic acid, L-histidine, L-proline, L-phenyl-alanine also possess a very good hypertensive action, and also that functional derivatives of these compounds, for example, the N-acyl-asparaginyl-octapeptides or octapeptides obtained as intermediate products in the process, and of which the amino group of the amidine radical is nitrated or the terminal carboxyl group is esterified, are also active and useful in the same respect. The activity also persists when the octapeptide molecule is simultaneously functionally converted at several places in the manner described above. This is important because the said intermediate products are more easily and therefore more cheaply obtained. The same applies to the use of the octapeptides in general as compared with the known decapeptides, and especially in the case of octapeptides which contain, instead of the valyl radical, the radical of a more easily obtainable amino-acid. The use of an octapeptide which contains the asparagine radical, instead of the asparaginic acid radical, likewise entails an improvement from the point of view of the method of production.

The aforesaid octapeptides can also be used as intermediate products for the manufacture of other active compounds. Thus, for example, the amide radical of asparagine can be converted by being subjected to the prolonged action of an acid or an alkali into the carboxyl group. By starting from L-asparaginyl-L-arginyl-L-valyl-L-tyrosyl-L-isoleucyl-L-histidyl-L-prolyl-L-phenylalanine hypertensin II is obtained, which is the first synthesis of this hormone to be described.

In the structure of the new octapeptides there are included among radicals of $\alpha$-amino-lower alkyl-acetic acids principally valyl and nor-valyl, and also leucyl, iso-leucyl and nor-leucyl and also alanyl, so that the radicals of natural amino-acids are preferred. The amino group of the lower alkyl group in the above mentioned $\alpha$-amino-(amino-lower alkyl)-acetic acids may be substituted, e.g. by an amidino or carbamyl group; free amino groups may be protected, preferably by a radical which can be split off by hydrolysis or reduction, such as the tosyl radical. $\alpha$-Amino-(amino-lower alkyl)-acetic acids are for example, arginine, lysine, ornithine, $\alpha,\gamma$-diaminobutyric acid or citrulline.

There are very many ways of producing the new peptides. Preferably there are used as starting materials an L-asparagine, of which the amino group is protected by a radical capable of being split off by reduction or hydrolysis, and an L-arginine, of which the amino group of the amidine group is protected by a radical capable of being split off by hydrolysis or reduction, advantageously a nitro group, and the radicals of an L-asparagine having a protected amino group, of an L-arginine having a protected amidino-group, of an L-$\alpha$-amino-lower alkyl-acetic acid, of an L-tyrosine having a free or substituted hydroxyl group, such as an ester or ether thereof, of an L-$\alpha$-amino lower alkyl-acetic acid, of L-histidine, of L-proline and of an L-phenylalanine ester are linked together in amide fashion to form an octapeptide having the aforesaid sequence of amino-acid radicals, in the polypeptide so obtained the esterified carboxyl group of the phenylalanine radical, the protected amino groups of the asparagine and arginine radicals and, if desired, a substituted hydroxyl group of the tyrosine radical, are set free, and, if desired, the carbonyl-amide group of the asparagine radical is converted into a free carboxyl group.

In a preferred form of the process nitro-L-arginine is acylated with an L-asparagine containing a protected amino group. The L-asparaginyl-nitro-L-arginine so obtained may then be condensed with an L-$\alpha$-amino-lower alkyl-acetyl-L-tyrosyl-L-$\alpha$-amino-lower alkyl-acetyl-L-histidyl-L-prolyl-L-phenyl-alanine ester to form the desired octapeptide. Alternatively, an L-asparaginyl-nitro-L-arginine may be condensed with an L-$\alpha$-amino-lower alkyl-acetyl-L-tyrosine to form an asparaginyl-nitro-L-arginyl-L-$\alpha$-amino-lower alkyl-acetyl-L-tyrosine, and the latter is reacted with an L-$\alpha$-amino-lower alkyl-acetyl-L-histidyl-L-prolyl-L-phenylalanine ester to form the octapeptide. It is also possible to acylate an L-$\alpha$-amino-lower alkyl-acetyl-L-tyrosyl-L-$\alpha$-amino-lower alkyl-acetyl-histidine with an L-asparaginyl-nitro-L-arginine, and to react the l-asparaginyl-nitro-L-arginyl-L-$\alpha$-amino-lower alkyl-acetyl-L-tyrosyl-L-$\alpha$-amino-lower alkyl-acetyl-histidine with L-prolyl-L-phenylalanine to form the octapeptide.

The polypeptides used in the acylation can be obtained in various ways. Thus, first L-$\alpha$-amino-lower alkyl-acetic acid may be condensed with L-tyrosine to form an L-$\alpha$-amino-lower alkyl-acetyl-L-tyrosine and with L-histidine to form an L-amino-lower alkyl-acetyl-L-histidine, and finally L-proline is condensed with L-phenylalanine ester to form the L-prolyl-L-phenylalanine ester. The L-$\alpha$-amino-lower alkyl-acetyl-L-histidine so obtained is then acylated with L-$\alpha$-amino-lower alkyl-acetyl-L-tyrosine to form the L-$\alpha$-amino-lower alkyl-acetyl-L-tyrosyl-L-$\alpha$-amino-lower alkyl-acetyl-L-histidine. Alternatively the L-$\alpha$-amino-lower alkyl-acetic acid may be condensed with the L-$\alpha$-amino-lower alkyl-acetyl-L-tyrosine to form the L-$\alpha$-amino-lower alkyl-acetyl-L-tyrosyl-L-$\alpha$-amino-lower alkyl-acetic acid and the latter is condensed with L-histidine.

In the above acylations there may be used the methods known for the production of polypeptides. Free amino groups which are not to take part in the reaction must be temporarily protected, especially by means of radicals capable of being split off by hydrolysis, for example, the carbobenzyloxy radical. The amino-acids to be acylated are advantageously used in the form of their esters. As methods of acylation there may be mentioned the reaction of an acid with the corresponding phosphite-amide, for example, with the corresponding diethyl phosphite-amide, the reaction of an acid with the amine in the presence of a carbo-diimide, such as in the presence of 1-cyclohexyl-3-(2 - morpholinyl-(4)-ethyl)-carbo - diimide, and especially the reaction of an amine with an activated ester in which there is advantageously present as an activating substituent in the alcohol component the cyano or nitro group.

The conversion of a protected amino group into a free amino group, and also the conversion of a functionally converted carboxyl group into a free carboxyl group in the course of the process for making the various polypeptides, and especially in the octapeptides obtained by the process, are carried out by methods in themselves known by treatment with hydrolysing or reducing agents.

In the products obtained by the process free carboxyl groups may be functionally converted, especially into esters or amides. It is also possible to substitute free amino groups, for example, by alkylation or acylation.

The products of the process may be obtained or used in the form of their salts.

The invention also includes any modification of the process in which there is used as starting material an intermediate product obtainable at any stage of the process and the remaining stages are carried out. Furmore, at any stage of the process the carrying out of the further process steps may be omitted, and, if desired, a functionally converted carboxyl or hydroxyl group and/or a protected amino group in the polypeptide obtained may be set free.

A particular form of the process, such as is described in the first of the following examples, is more fully explained by the following scheme:

(1) N - carbobenzyloxy-L-asparaginyl-nitro-L-arginine methyl ester (III):

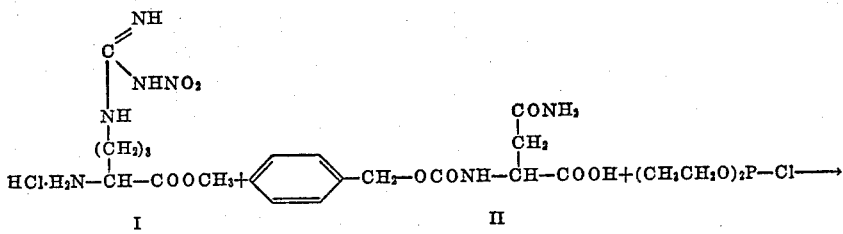

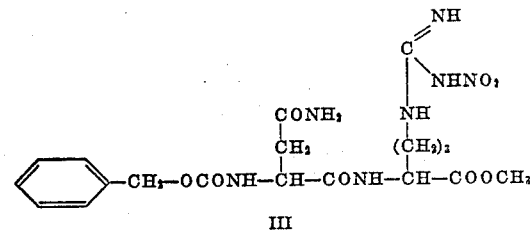

(2) N - carbobenzyloxy-L-asparaginyl-nitro-L-arginine (IV):

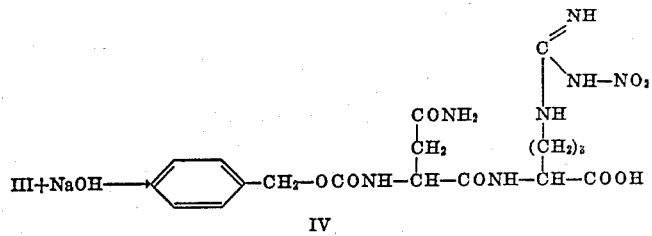

(3) N - carbobenzyloxy-L-asparaginyl-nitro-L-arginyl-L-valyl-L-tyrosine methyl ester (VI):

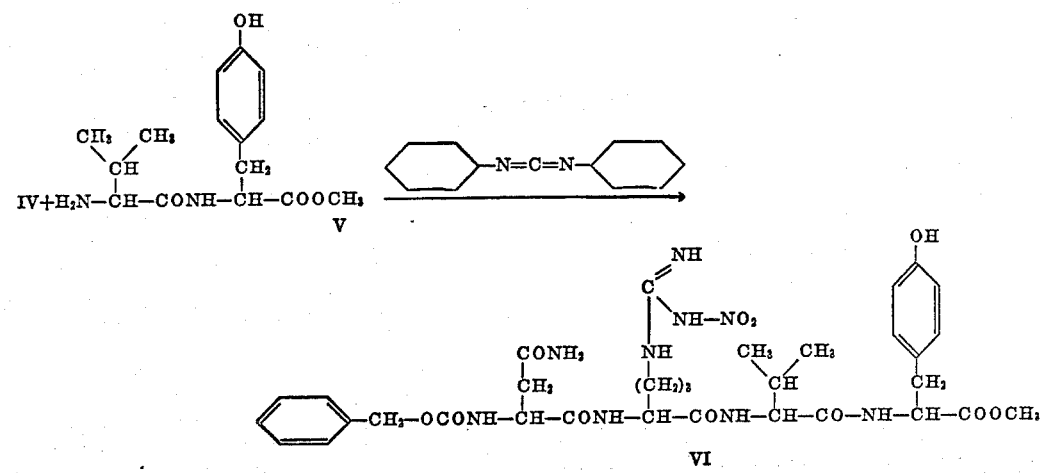

(4) N-carbobenzyloxy-L-asparaginyl-nitro-L-arginyl-L-valyl-L-tyrosine (VII):

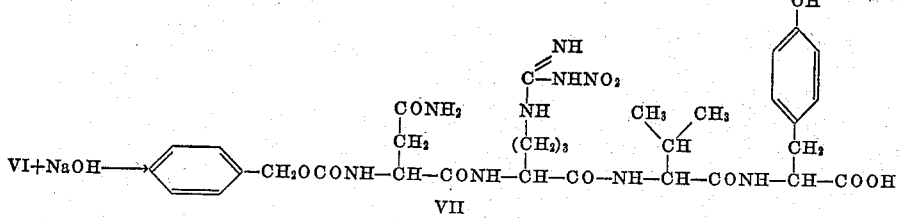

(5) N-carbobenzyloxy-L-asparaginyl-nitro-L-valyl-L-tyrosyl-L-isoleucyl-L-histidyl-L-prolyl-L-phenylalanine methyl ester (IX):

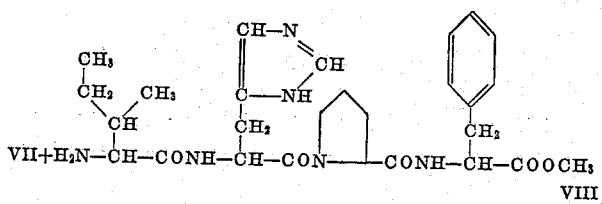

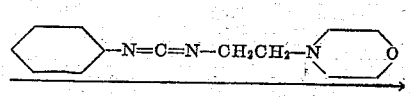

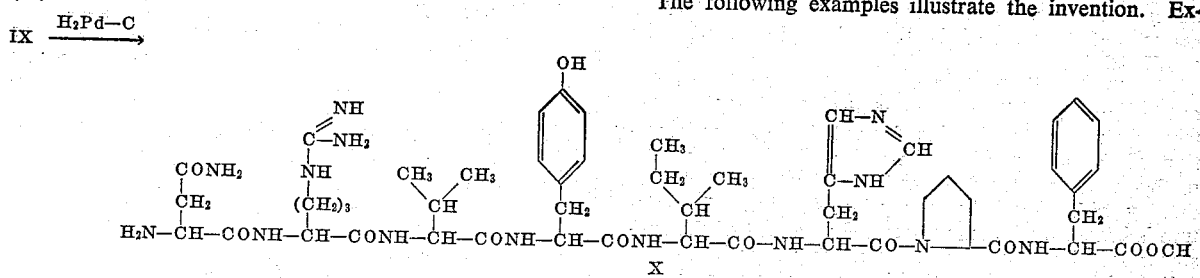

(6) L-asparaginyl-L-arginyl-L-valyl-L-tyrosyl-L-isoleucyl-L-histidyl-L-prolyl-L-phenylalanine methyl ester (X):

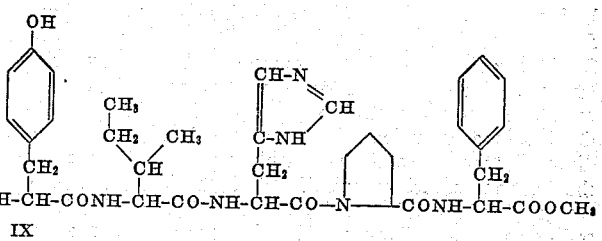

(7) L-asparaginyl-L-arginyl-L-valyl-L-tyrosyl-L-isoleucyl-L-histidyl-L-prolyl-L-phenylalanine (XI):

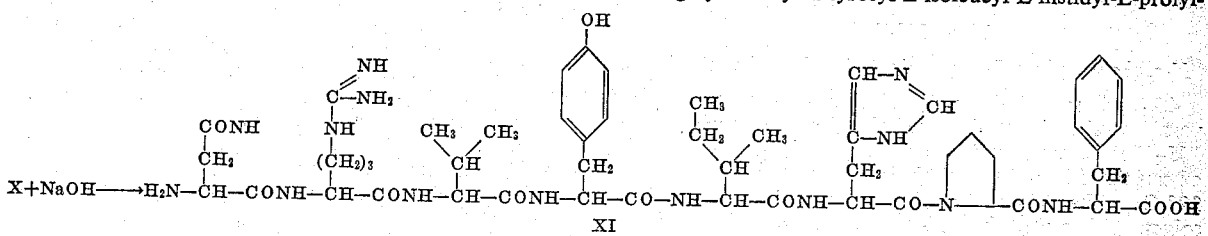

The polypeptides obtained by the process of this invention and their functional derivatives can be used as intermediate products for the manufacture of medicaments or they may be used as medicaments in the form of pharmaceutical preparations. These preparations contain the peptide in admixture with a pharmaceutical organic or inorganic carrier suitable for enteral, parenteral or local administration. For making the carrier there are used substances which do not react with the polypeptide, for example, gelatine lactose, glucose, sodium chloride, starches, magnesium stearate, talc, vegetable oils, benzyl alcohols, gums, polyalkylene, glycols, white petroleum jelly, cholesterol or other known carrier for medicaments. The pharmaceutical preparations may be, for example, in the form of tablets, dragees, powders, salves, creams or suppositories, or in liquid form as solutions, suspensions or emulsions. If desired, they may be sterilized and/or may contain auxiliary substances, such as preserving, stabilizing, wetting or emulsifying agents. They may also contain other therapeutically valuable substances.

The following examples illustrate the invention. Examples 1–15 relate to the production of L-asparaginyl-L-arginyl-L-valyl-L-tyrosyl-L-isoleucyl-L-histidyl-L-prolyl-L-phenylalanine; Examples 16–26 illustrate the production of L-asparaginyl-L-arginyl-L-valyl-L-tyrosyl-L-valyl-L-histidyl-L-prolyl-L-phenylalanine; Examples 27–35 illustrate the production of L-asparaginyl-L-arginyl-L-valyl-L-tyrosyl-L-leucyl-L-histidyl-L-propyl-L-phenyl-alanine. Examples 36–40 illustrate the production of L-asparaginyl-L-lysyl-L-valyl-L-tyrosyl-L-leucyl-L-histidyl-L-prolyl-L-phenylalanine; Examples 41–44 the production of L-asparagyl-L-arginyl-L-leucyl-L-tyrosyl-L-isoleucyl-L-histidyl-L-pyrolyl-L-phenylalanine and Examples 45–48 that of L-leucyl-L-tyrosyl-L-isoleucyl-L-histidyl-L-prolyl-L-phenylalanine methyl ester. These compounds can be hydrolyzed to the corresponding asparagyl-octa- or hexa- peptides by treatment with an aqueous or alcoholic solution of an alkali, for example, caustic soda solution in methanol, or with aqueous or alcoholic solutions of mineral acids.

EXAMPLE 1

*N-carbobenzyloxy-L-asparaginyl-nitro-L-arginine-methyl ester (III)*

(a) 10.0 grams of nitro-L-arginine-methyl ester hydrochloride (0.0371 mol) (I) are finely pulverized, dried for a few hours at 60° C. in a high vacuum, and suspended in 100 ml. of absolute dioxane. After the addition of 9.0 grams (0.089 mol) of triethylamine the whole is stirred for 2 hours at room temperature, then cooled to +10° C., and 7.1 grams (0.0408 mol) of diethyl chlorophosphite (about 98% strength) dissolved in 20 ml. of dioxane are added dropwise. After stirring for one hour at room temperature the triethyl-ammonium chloride formed is filtered off, washed with a small amount of dioxane, and the filtrate is evaporated at 80° C. in vacuo. The yellowish viscous residue is maintained with 40 ml. of diethyl phosphite and 9.85 grams (0.0371 mol) of well dried N-carbobenzyloxy-L-asparagine (II) for 2 hours at 0° C. (homogeneous solution). Finally the solvent is evaporated at about +50° C. in a high vacuum, the oily residue, which still contains about 5 grams of diethyl phosphite, is taken up in 60 ml. of 2 N-hydrochloric acid and extracted three times with 600 ml. of ethyl acetate on each occasion. The ethyl acetate extracts are washed in turn twice with 2 N-hydrochloric acid, twice with a saturated solution of sodium bicarbonate and twice with water. (Volumes of the aqueous solutions are 60 ml. in each case, always saturated with sodium sulfate.) By drying with solid sodium sulfate and evaporating in vacuo there are obtained 9.9 grams of a mass which is crystalline for the greater part. It is triturated with 100 ml. of hot water, allowed to cool and filtered. The residue (III), after being dried in a high vacuum at 80° C., weighs 5.95 grams (=33 percent of the theoretical yield) and melts at 150–165° C.

(b) Modification: The condensation can be carried out in dioxane in the absence of diethyl phosphite. The triethyl-ammonium chloride formed during the formation of the diethyl phosphite-amide of nitro-L-arginine methyl ester is filtered off and the filtrate is condensed directly with N-carbobenzyloxy-L-asparagine. The mixture is heated for 2 hours under reflux, a part of the substance remaining undissolved as an oily deposit.

The yield, when the quantities are the same as under (a), amounts to 6.10 grams of dipeptide melting at about 145–160° C. (34% of the theoretical yield).

EXAMPLE 2

*N-carbobenzyloxy-L-asparaginyl-nitro-L-arginine (IV)*

4.74 grams (0.0099 mol) of N-carbobenzyloxy-L-asparaginyl-nitro-L-arginine methyl ester (III) melting at 165–170° C. are mixed with 11.0 ml. of a 1 N-solution of caustic soda and the whole is agitated for one hour at 22° C. After about 15 minutes the greater part dissolves. After a further 15–20 minutes the precipitation of a voluminous precipitate (sodium salt of IV) sets in. The precipitate is dissolved towards the end by adding 20 ml. of water, the solution is filtered to remove a trace of undissolved material, and then carbon dioxide is introduced until the pH value of the solution is 8.5.

The aqueous phase is then washed twice with 80 ml. of ethyl acetate on each occasion, and the ethyl acetate solutions are washed once with a small amount of sodium bicarbonate solution.

The aqueous phase and the bicarbonate washings are united, the mixture is adjusted to a pH value of 1 with 2 N-hydrochloric acid, whereupon amorphous material separates out. The latter is dissolved by extraction four times with 250 ml. of ethyl acetate on each occasion. The ethyl acetate solutions are washed twice with a small amount of sodium sulphate solution, then dried over sodium sulfate, and 4.46 grams of a partially crystalline residue are obtained by evaporation. By crystallisation from acetonitrile there is obtained a total of 3.26 grams of N-carbobenzyloxy-L-asparaginyl-nitro-L-arginine (IV) in the form of clusters of needles melting at 94–98° C. (71% of the theoretical yield). After recrystallisation twice from acetonitrile the product melts at 98–101° C. and has the specific rotation $[\alpha]_D = +10° \pm 4°$ (c.=1.4 in methanol).

The crystals are soluble in methanol, dimethyl-formamide, hot acetonitrile and hot water, and sparingly soluble in cold water and acetonitrile, ethyl acetate, tetrahydrofurane and acetone, and slightly soluble in a saturated solution of sodium bicarbonate.

EXAMPLE 3

*N-carbobenzyloxy-L-asparaginyl-nitro-L-arginyl-L-valyl-L-tyrosine methyl ester (VI)*

3.72 grams (13 millimols) of freshly prepared L-valyl-L-tyrosine methyl ester (V) and 5.47 grams (11.8 millimols) of carbobenzyloxy-L-asparaginyl-nitro-L-arginine (IV) are dissolved in 35 cc. of dimethyl-formamide, and 2.52 grams (12.3 millimols) of 1:3-dicyclohexylcarbodiimide are added. After 24 hours at 21° C., the precipitated dicyclohexylurea is filtered off with suction, and the filtrate is completely freed from dimethyl-formamide under 0.1 mm. pressure of mercury and at a bath temperature of 45° C. The oil which remains behind is first washed with petroleum ether, and then, while cooling with ice, washed with dilute bicarbonate solution, water, dilute hydrochloric acid, and water, whereby the initially oily product slowly becomes granular. The crude product (8.79 grams) is reprecipitated from hot methanol for further purification, and the powder insoluble in methanol is triturated with hot acetone. In this manner 2.91 grams (33%) of carbobenzyloxy-L-asparaginyl-nitro-L-arginyl-L-valyl-L-tyrosine methyl ester (VI) are obtained melting at 202–206° C., and having the specific rotation $[\alpha]_D^{23} = -4° \pm 4°$ (c.=0.94 in dimethyl-formamide).

The L-valyl-L-tyrosine methyl ester (V) used as starting material is prepared in the manner described below in Example 9.

EXAMPLE 4

*N-carbobenzyloxy-L-asparaginyl-nitro-L-arginyl-L-valyl-L-tyrosine (VII)*

2.58 grams (2.5 millimols) of N-carbobenzyloxy-L-asparaginyl-nitro-L-arginyl-L-valyl-L-tyrosine methyl ester (VI) are dissolved in 30 cc. of dimethyl-formamide, and a total of 100 cc. of 1/10 N-caustic soda solution is added in several portions in the course of 15 minutes, care being taken that the pH value of the solution does not exceed 11. After the addition of the caustic soda solution, the mixture is allowed to stand for a further 15 minutes at a pH value of 11, it is then adjusted to a pH value of 8 by the addition of solid carbon dioxide, and the solution is freed first at 11 mm. pressure and a bath temperature of 45° C. from water, and then at 0.1 mm. from dimethyl-formamide. The residue is dissolved in 30 cc. of water, the solution is filtered to remove a trace of flocks, and the clear filtrate is acidified with 2 N-hydrochloric acid while cooling. The precipitated viscous product is triturated, while cooling with ice, and thereby becomes solid. The crude product (2.14 grams) is dissolved in hot methanol and precipitated by the addition of acetonitrile. There are obtained 1.77 grams (70%) of N-carbobenzyloxy-L-asparaginyl-nitro-L-arginyl-L-valyl-L-tyrosine (VII) in the form of a powder melting at about 175 to 183° C. (frothing), and having the specific rotation $[\alpha]_D^{23} = 0° \pm 4°$ (c.=0.4 in methanol).

EXAMPLE 5

N - carbobenzyloxy - L - asparaginyl - nitro - L - arginyl-L - valyl - L - tyrosyl - L - isoleucyl - L - histidyl - L-prolyl-L-phenylalanine methyl ester (IX)

1.88 grams (2.58 millimols) of carbobenzyloxy-L-asparaginyl-nitro-L-arginyl-L-valyl-L-tyrosine (VII) and 1.31 grams (2.50 millimols) of freshly prepared L-isoleucyl-L-histidyl-L-prolyl-L-phenylalanine methyl ester (VIII) are dissolved in 15 cc. of dimethyl-formamide and a solution of 0.62 gram (2.62 millimols) of 1-cyclohexyl - 3 - morpholinylethylcarbodiimide is added. The solution is maintained at 20° C. for 21 hours, then the dimethyl-formamide is removed in a high vacuum and the residual oil is triturated with water, while cooling with ice, during which it gradually becomes granular. The powder is washed several times with water, then with dilute bicarbonate solution and water, and dried. The crude product (3.70 grams) is washed for further purification with acetone and methanol, and yields 0.68 gram of N-carbobenzyloxy - L - asparaginyl-nitro-L-arginyl-L-valyl - L - tyrosyl - L - isoleucyl - L - histidyl - L - prolyl-L-phenylalanine methyl ester (IX) melting at 190–205° C. and having the specific rotation $[\alpha]_D^{23} = -29° \pm 4°$ (c.=0.52 in dimethyl-formamide). The product is sparingly soluble in the usual organic solutions except in dimethyl-formamide. It is soluble in very dilute hydrochloric acid.

The L-isoleucyl - L - histidyl-L-prolyl-L-phenylalanine methyl ester (VIII) used as starting material is prepared as described below in Example 15.

EXAMPLE 6

L-asparaginyl-L-arginyl-L-valyl - L - tyrosyl-L-isoleucyl-L-histidyl-L-prolyl-L-phenylalanine methyl ester (X)

370 milligrams (0.3 millimol) of carbobenzyloxy-L-asparaginyl-nitro-L-arginyl - L - valyl - L - tyrosyl-L-isoleucyl-L-histidyl-L-prolyl-L-phenylalanine methyl ester (IX) are suspended in 15 cc. of methanol and brought into solution by the addition of 1.0 cc. of a 1.24 N-solution of hydrochloric acid (4 equivalents) in methanol. A trace of flocks is removed by filtration and the solution is hydrogenated in the presence of 100 milligrams of palladium-charcoal (10% Pd) at room temperature under atmospheric pressure (a second hydrogenation vessel charged with dilute caustic soda solution being used to absorb the carbon dioxide evolved). The hydrogenation is complete in 13 hours and after the absorption of somewhat more than the calculated quantity of hydrogen. The solution is then filtered to remove the catalyst and the filtrate is evaporated to dryness in vacuo. The residue (resin) weighs 310 milligrams (calculated for a mixture of equimolecular quantities of the trihydrochloride and ammonium chloride=360 milligrams). The product (X) is further treated without purification. It is easily soluble in water but is sparingly soluble in aqueous alkalies, and is soluble in methanol and insoluble in ether.

EXAMPLE 7

L-asparaginyl-L-arginyl-L-valyl - L - tyrosyl-L-isoleucyl-L-histidyl-L-prolyl-L-phenylalanine (XI)

An 0.1 N-solution of caustic soda is added in several portions to a solution of 256 milligrams (25 millimols) of L-asparaginyl-L-arginyl - L - valyl-L-tyrosyl-L-isoleucyl-L-histidyl-L-prolyl-L-phenylalanine methyl ester (X) in 12.0 cc. of methanol of 66% strength until the pH value of the solution remains at 10.5–11.0 for 20 minutes (a total of 18 cc. of the caustic soda solution is added). After a total of 30 minutes the pH value is adjusted to 8 by the addition of a little solid carbon dioxide, a flocculent precipitate (25 milligrams) is removed by filtration, and the filtrate is freed from methanol in vacuo. The aqueous solution (volume of 15 cc.) is mixed with a few cc. of dilute sodium carbonate solution, and the whole is agitated at a pH value of 9 four times with 100 cc. of n-butanol saturated with water each time. The butanol extracts are washed once with 8 cc. of dilute sodium sulfate solution, dried with sodium sulfate, and upon evaporation yield 195 milligrams of crude product. The latter is washed three times with 5 cc. of dry n-butanol on each occasion, whereby 30 milligrams of the more easily soluble constituents are removed. The greater part (135 milligrams) of the L-asparaginyl-L-arginyl-L-valyl-L-tyrosyl-L-isoleucyl-L-histidyl - L - propyl-L-phenylalanine (XI) is sparingly soluble in dry butanol and is obtained in the form of a colorless finely granular deposit. The product is soluble in water and methanol.

The crude product (135 mg.) is subjected to a 32-stage multiplicative distribution (Craig's basic process) in the system n-butanol-water. The main quantity (75 mg.) of the active material is found in fractions 9–21 with a maximum in fraction 15 (G=0.89). Fractions 0–8 contain 45 mg. of a slowly migrating inactive impurity. Fractions 22–32 contain about 20 mg. of inactive material. A sample of the substance obtained from fraction 15 in the test apparatus of Peart has twice as strong an action on rats as nor-adrenaline (0.25γ per kilogram of body weight in 0.1 cc. of physiological salt solution injected intravenously, whereas nor-adrenaline gives 0.5γ).

The material from fractions 9–21 is combined and again distributed in the same manner. Activity is again found in fractions 9–22, which contain a total of 32 mg. of material (maximum in fraction 16). Fractions 0–8 contain 20 milligrams of inactive material and fractions 23–32 contain about 15 milligrams of inactive material.

A sample of the substance from fraction 16 when tested in the manner referred to above was 5–10 times as strong in its action as nor-adrenaline.

The material from fractions 9–22 is again combined and subjected to distribution in the system n-butanol/acetic acid of 4% strength in 30 stages (Craig's basic process). When the 30-stage distribution is complete, the pH value of all the fractions is brought to 5.5–6.0 by the addition of a small amount of a methanolic solution of ammonia, the solutions are evaporated to dryness at 40° C. under reduced pressure, and the residue is dried for 8 hours at 50° C. under 0.01 mm. pressure in order to remove ammonium acetate. Fractions 0–6 contain a total of 30 mg. of product (maximum in fraction 1, K=0.051). Fractions 7–30 contain no weighable constituents. The weight distribution curve of the amounts found experimentally in fractions 0–6 agrees with the quantity theoretically calculated. A sample of the product from fraction 1 showed in the aforesaid test of Peart an activity five times greater than that of nor-adrenaline. The L-asparaginyl-L-arginyl-L-valyl-L-tyrosyl-L-isoleucyl-L-histidyl-L-prolyl-L-phenylalanine so purified is obtained in the form of a colorless powder melting at 195–205° C. (with decomposition), after being dried in a high vacuum. In paper chromatography it exhibits in the systems ethanol/n-butanol/$H_2O$/diethylamine (100 : 100 : 50 : 20), n-butanol/acetone/$H_2O$/diethylamine (100 : 100 : 50 : 20), ethanol/n-butanol/$H_2O$ (100 : 100 : 50), n-butanol/glacial acetic acid/$H_2O$ (100 : 10, saturated with $H_2O$) and secondary butanol/ammonia solution of 3% strength (120 : 44) on Whatman No. 1 the $R_f$-values 0.37; 0.31; 0.18; 0.15 and 0.24 respectively. The spots exhibit the Pauly reaction. No ninhydrin-positive substances are detectable on the paper.

EXAMPLE 7a

L-asparagyl-L-arginyl-L-valyl-L-tyrosyl-L-isoleucyl-L-histidyl-L-prolyl-L-phenylalanine 5 milligrams of L-asparaginyl-L-arginyl-L-valyl-L-tyrosyl - L - isoleucyl - L - histidyl - L - prolyl - L - phenylalanine (XI) are dissolved in 0.1 ml. of concentrated hydrochloric acid, and the solution is allowed to stand for 100 minutes at 39° C. The solution is then evaporated to dryness in a high vacuum, the residue is pulverized and then dried at 40° C. in a high vacuum. The resulting L - asparagyl - L - arginyl - L - valyl - L - tyrosyl - L-isoleucyl-L-histidyl-L-pyrolyl-L-phenylalanine (hypertensin II) can be separated from the non-hydrolyzed starting material by the Craig distribution or by chromatography on a cellulose column with a suitable spectrum of solvents, for example, butanol/methanol/0.33 molar $NH_4COOH$ (3 : 1 : 4; pH=6.5) or secondary butanol/ammonia solution of 3% strength (120 : 44). It is a water-soluble colorless powder having an $R_f$=0.2 in the system secondary butanol/ammonium solution of 3% strength.

EXAMPLE 8

*N-carbobenzyloxy-L-valyl-L-tyrosine-methylester*

A solution of 68.1 grams (0.275 mol) of carbobenzyloxy-L-valine and 50.9 grams (0.261 mol) L-tyrosine-methyl ester in 1 liter of tetrahydrofurane is mixed with 59.2 grams of 1 : 3-dicyclohexyl-carbodiimide and the solution is allowed to stand for 16 hours at 21° C. Thereupon the separated dicyclohexyl-urea is filtered off with suction (46.0 grams corresponding to 77% of the theoretical yield, and melting at 218–224° C.), and the filtrate evaporated to dryness. The residue (a viscous oil) is triturated with 300 cc. of hot petroleum ether until crystallization commences. The crystals formed are filtered off with suction and washed with a large amount of hot petroleum ether. Recrystallization from a mixture of acetone and petroleum ether gives a total quantity of 91 grams (81%) of carbobenzyloxy-L-valyl-L-tyrosine-methyl ester (V) M.P. 144–147° C., $[\alpha]_D^{22}=+19°\pm4°$ (c.=1.06 in chloroform).

From the remaining petroleum ether solution and also from the mother liquor from the crystals referred to, a total quantity of 17 grams of a by-product is obtained of M.P. 128–130° C. (from petroleum ether). This product is 1-(carbobenzoxy-L-valyl)-1 : 3-dicyclohexyl-urea.

EXAMPLE 9

*L-valyl-L-tyrosine-methyl ester (V)*

(a) L-valyl-L-tyrosine-methyl ester hydrobromide: 20.0 grams (0.0468 mol) of carbobenzoxy-L-valyl-L-tyrosine-methyl ester are dissolved in 200 cc. of a 1.1 N-solution of hydrobromic acid in glacial acetic acid. After 1 hour at 21° C. the mixture is evaporated to dryness under vacuum at a bath temperature of 45° C. and the remaining oil is triturated with a large amount of ether as a result of which the oil solidifies. The residue is washed with ether, and there are obtained 17.26 grams (98%) of L-valyl-L-tyrosine-methyl ester hydrobromide, M.P. 206–208° C. By recrystallization from methanol-ether, needles are obtained of M.P. 208–209° C.; $[\alpha]_D=+31°\pm4°$ (c.=1.08 in methanol).

(b) L-valyl-L-tyrosine-methyl ester: 5.63 grams (15 mmol) of the hydrobromide obtained as described under (a) are suspended in 80 cc. of ethyl acetate and 2.1 cc. (15 mmol) of triethylamine are added. The precipitated crystals of triethylamine hydrobromide are filtered off with suction after 10 minutes (2.68 grams corresponding to 99% of the theoretical yield) and the filtrate is evaporated to dryness. The remaining L-valyl-L-tyrosine-methyl ester (resin 4.61 grams) is immediately further worked up as described in Example 3.

EXAMPLE 10

*N-carbobenzyloxy-L-isoleucyl-L-histidine methyl ester hydrochloride*

To a solution of 44.0 grams (0.26 mol) of L-histidine methyl ester in 50 ml. of acetonitrile are added 55.5 grams (0.27 mol) of dicyclohexyl-carbodiimide, dissolved in 100 ml. of ethyl acetate, and 71.5 grams (0.27 mol) of N-carbobenzyloxy-L-isoleucine, dissolved in 700 ml. of ethyl acetate. Slight heating immediately takes place and soon afterwards crystalline dicyclohexyl urea separates. The whole is cooled with ice for a short time so that the temperature does not rise above about +30° C. After a few minutes there is produced from the mixture a jelly-like mass which is allowed to stand overnight at room temperature.

The mixture is filtered and the residue triturated twice, each time with 50 ml. of ethyl acetate, then filtered with suction, and finally dried under vacuum at 90° C. from the resulting mixture of dipeptide and dicyclohexyl-urea, the former is dissolved out with a solution of 25 ml. of concentrated hydrochloric acid in 20 ml. of water and 80 ml. of methanol, in the form of the hydrochloride, and the residue is again washed twice, in each case with 2 ml. of concentrated hydrochloric acid in 10 ml. of water and 20 ml. of methanol. The combined filtrates are evaporated under vacuum to dryness, and the residue is crystallized from a mixture of methanol and ethyl acetate. There are obtained 52.6 grams of dipeptide hydrochloride (equals 44.6% of the theoretical yield) melting at 170–172° C. with decomposition. From the mother liquors by further evaporation and dilution with ethyl acetate, a further 39.1 grams of hydrochloride (33.1% of the theoretical yield) melting at 160–165° C. (with decomposition) are obtained.

EXAMPLE 11

*N-carbobenzyloxy-L-isoleucyl-L-histidine hydrazide*

2.5 grams (0.0053 mol) of N-carbobenzyloxy-L-isoleucyl-L-histidine methyl ester hydrochloride monohydrate are boiled for 1 hour under reflux in 10 mol of absolute methanol with 1.5 ml. of hydrazine hydrate. The solvent is evaporated under vacuum to considerable extent, and the residue is treated with 100 ml. of ice water. The initially oily precipitate crystallizes after short standing at 0° C. The carbobenzyloxy-dipeptide hydrazide is filtered off, washed with a large amount of water, and dried under vacuum over phosphorus pentoxide and sulfuric acid. The crude yield is 1.82 grams (equals 83%); recrystallization once from boiling water gives 1.6 grams of analytically pure product; M.P.=186–187° C. $[\alpha]_D^{20}=51°\pm4°$ (c.=1.327 in 1 N-hydrochloric acid; $[\alpha]_D^{20}=-22°\pm4°$ (c.=0.558 in methanol).

The hydrazide is easily soluble in methanol, ethanol, acetone, ethyl acetate and N-hydrochloric acid, sparingly soluble in hot water, and insoluble in benzene, ether and petroleum ether.

EXAMPLE 12

*N-carbobenzyloxy-L-prolyl-L-phenylalanine methyl ester*

To a solution of 1 gram (0.004 mol) of crystalline N-carbobenzyloxy-L-proline in 15 ml. of absolute tetrahydrofurane there is added at −10° C. 0.61 ml. (0.0044 mol) of triethylamine and after 5 minutes at the same temperature also 0.42 ml. (0.0044 mol) of chloroformic acid ethyl ester. Triethylamine hydrochloride precipitates immediately as a white crystalline deposit.

A solution of L-phenylalanine methyl ester prepared at the same time from 1.1 grams (0.0051 mol) of phenylalanine methyl ester hydrochloride and 0.71 ml. (0.0055 mol) of triethylamine, and filtered to remove triethylamine hydrochloride, is likewise cooled to −10° C., and added to the solution of the mixed anhydride. After 2 hours' standing at room temperature the liquid is filtered from the precipitate, and the solvent is evaporated under vacuum at 40–45° C. The water-clear residue is taken up in ethyl acetate, washed four times, in each case with 5 ml. of N-hydrochloric acid solution, twice with water, four times with 2 ml. of 2 N-sodium bicarbonte solution each time and finally with water until neutral. The ethyl acetate solution, on evaporation and drying, leaves 1.8 grams of a yellowish oil which still contains a little solvent. The crude carbobenzyloxy-L-prolyl-L-phenylalanine methyl ester is immediately decarbobenzoxylated to L-prolyl-L-phenylalanine methyl ester.

EXAMPLE 13

L-prolyl-L-phenylalanine methyl ester 2.46 grams (0.006 mol) of carbobenzyloxy-L-prolyl-L-phenylalanine methyl ester are dissolved in 40 ml. of methanol, 6 equivalents of methanolic hydrochloric acid and 0.6 gram of palladium charcoal (10% Pd) are added, and hydrogenation is carried out at room temperature and under normal pressure, the carbon dioxide formed being absorbed in caustic soda. When somewhat more than the calculated quantity of hydrogen has been absorbed the hydrogenation ceases. The solution is filtered to remove the catalyst, and then evaporated under vacuum, and the residue is taken up in a little acetone. On addition of ether, the hydrochloride of L-prolyl-L-phenylalanine methyl ester separates out in crystalline form; yield: 1.62 grams (86%). After recrystallization twice from a mixture of acetone and ether, the substance melts at 157–158° C.; $[\alpha]_D^{23} = -41° \pm 1°$ (c.=4.15 in water).

For conversion into the free ester, a solution of 1.10 grams (0.0035 mol) of the hydrochloride in 1 ml. of water is covered with a layer of ethyl acetate and treated at 0° C. while shaking vigorously, with saturated potassium carbonate solution. The ethyl acetate extract is dried, evaporated under vacuum, and the residue is dried under 0.1 mm. pressure. The resulting L-prolyl-L-phenylalanine methyl ester (0.98 gram) is an oil, easily soluble in water and ether, which can be used directly for further reactions.

EXAMPLE 14

N-carbobenzyloxy-L-isoleucyl-L-histidyl-L-prolyl-L-phenyl-alanine methyl ester A solution of 1.49 grams (0.035 mol) of N-carbobenzyloxy-L-isoleucyl-L-histidine hydrazide (Example 11) in 15 ml. of N-hydrochloric acid is extracted once with a little ethyl acetate, the ethyl acetate phase is washed with 3 ml. of N-hydrochloric acid, and the combined hydrochloric acid solutions are covered with a layer of ethyl acetate in a separating funnel, and the whole is cooled with ice to 0° C. Thereupon 275 mg. (0.004 mol) of sodium nitrite in 5 ml. of ice water are slowly added dropwise, reaction allowed to take place for three minutes, and the hydrochloric acid azide solution is rendered alkaline to phenolphthalein with 3 ml. of saturated potassium carbonate solution. The aqueous solution is extracted twice more with a large amount of ethyl acetate, while cooling with ice, and the organic phases are washed neutral with water.

The ice cold azide solution, dried over sodium sulfate, is filtered into a freshly prepared solution, freed from triethylamine hydrochloride and cooled to 0° C., of L-prolyl-L-phenylalanine methyl ester, prepared from 1.24 grams (0.004 mol) of L-prolyl-L-phenylalanine methyl ester hydrochloride and 0.55 ml. (0.004 mol) of triethylamine in 15 ml. of absolute ethyl acetate.

Reaction is allowed to take place for 18 hours at 0–5° C. and 2 hours at room temperature, the solvent is evaporated under vacuum at 40° C. to half the volume, and the residue is washed with N-hydrochloric acid, ice cold 2 N-sodium carbonate solution and with water until neutral, dried over sodium sulfate, and the ethyl acetate is evaporated under vacuum.

The yield is 2 grams (85%) of yellowish amorphous carbobenzyloxy-tetrapeptide ester. A 36 stage distribution between 80% methanol and a mixture of chloroform and carbon tetrachloride (1 : 1) gives 1.6 grams of pure N - carbobenzyloxy-L-isoleucyl - L - histidyl-L-prolyl-L-phenylalanine methyl ester. An analysis fraction, after reprecipitation once from methanol-water has a melting point 105–110° C.; $[\alpha]_D^{22} = -56° \pm 4°$ (c.=0.971 in methanol).

The N-carbobenzyloxy-tetrapeptide ester is of good solubility in most organic solvents with the exception of ether and petroleum ether.

EXAMPLE 15

L-isoleucyl-L-histidyl-L-prolyl-L-phenylalanine methyl ester (a) Dihydrobromide: 1.72 grams (2.61 mmol) of N-carbobenzyloxy - L - isoleucyl-L-histidyl-L-prolyl-L-phenylalanine methyl ester are mixed with 8.3 cc. of 1–1 N-hydrogen bromide in glacial acetic acid, whereupon solution immediately takes place. After 2 hours' standing at 21° C., the glacial acetic acid is completely distilled off at 25° C., under 0.1 mm. pressure, and the remaining resin is triturated with ether whereby it becomes granular. The crude L - isoleucyl - L - histidyl-L-prolyl-L-phenylalanine methyl ester dihydrobromide weighs 1.79 grams, M.P. 130–140° C.

(b) Free ester: 1.96 grams (2.85 mmol) of L-isoleucyl-L-histidyl-L-prolyl-L-phenylalanine methyl ester dihydrobromide are dissolved in a little water, a slight turbidity is removed by washing with a little ethyl acetate, the aqueous solution is treated with 50 cc. of chloroform, and saturated potassium carbonate solution is added with ice cooling until the pH of the aqueous phase amounts to 10. The separated ester dissolves easily in the chloroform phase on shaking. The chloroform solution is washed once with a little saturated sodium sulfate solution. Potassium carbonate and sodium sulfate solutions are washed with a further 30 cc. of chloroform. After drying with sodium sulfate and evaporation, the chloroform solutions leave as a residue 1.31 grams of L-isoleucyl-L-histidyl-L-prolyl-L-phenylalanine methyl ester (VIII) as a resin, which is immediately further worked up (cf. Example 5); yield 88%.

EXAMPLE 16

N - carbobenzyloxy - L - asparaginyl - nitro - L - arginyl - L - valyl - L - tyrosyl - L - valyl - L - histidyl - L - prolyl-L-phenylalanine methyl ester A solution of 467 mg. (1 mmol) of N-carbobenzyloxy-L-asparaginyl-nitro-L-arginine and 272 mg. (0.35 mmol) of L-valyl-L-tyrosyl-L-valyl-L-histidyl-L-prolyl-L-phenylalanine methyl ester in 2.5 ml. of dimethyl-formamide is treated with 237 mg. (1 mmol) of 1-cyclohexyl-3-morpholinylethyl-carbodiimide. After 24 hours' standing at room temperature, the reaction solution is freed from dimethyl-formamide at 35° C. under 0.1 mm. pressure. The residue is triturated with ice water, and the separated solid material is washed with water and dried under vacuum at 30° C. The crude product is triturated with acetone, then extracted with boiling acetone, and finally washed with ice cold methanol. The material thus purified (289 mg. 67%) is a faintly yellowish powder of M.P. 207–210° C.

For further purification, the substance is distributed in counter-current between n-butanol and 0.1% acetic acid in 30 stages (K=4.17). Fractions 23–28 yield 132 mg. of pure product and fractions 17–22 (74 mg.) give on further distribution another 34 mg. of pure material; total 166 mg. (39%). After reprecipitation twice from methanol the substance melts at 214-216° C;

$$[\alpha]_D^{23} = -27° \pm 2°$$

(c.=2.22 in dimethyl-formamide).

The L - valyl - L - tyrosyl - L - valyl - L - histidyl - L - prolyl-L-phenylalanine methyl ester is prepared as described below (Example 19 et seq.).

EXAMPLE 17

L - asparaginyl - L - arginyl - L - valyl - L - tyrosyl - L - valyl - L - histidyl - L - prolyl - L - phenylalanine methyl ester 85 mg. (0.07 mmol) of N-carbobenzyloxy-L-asparaginyl - nitro - L - arginyl - L - valyl - L - tyrosyl - L - valyl - L - histidyl - L - prolyl - L - phenylalanine methyl ester are suspended in 10 ml. of methanol, brought into solution by the addition of 0.3 molar equivalents of methanolic hydrochloric acid and shaken at room temperature under normal pressure for 15 hours in a hydrogen atmosphere in the presence of 0.3 gram of palladium-charcoal (10% Pd). The neutral solution is filtered from the catalyst and evaporated under vacuum. The semi-solid reaction product is washed with acetone and gives after precipitation from a mixture of methanol and ether 51 mg. (63%) of the trihydrochloride of the octapeptide methyl ester.

EXAMPLE 18

*L-asparaginyl-L-arginyl-L-valyl-L-tyrosyl-L-valyl-L-histidyl-L-prolyl-L-phenylalanine*

(a) 48 mg. (0.042 mmol) of L-asparaginyl-L-arginyl-L - valyl - L - tyrosyl - L - valyl - L - histidyl - L - prolyl - L-phenylalanine methyl ester tri-hydrochloride are suspended in 0.5 ml. of methanol, and treated gradually in the course of 1 hour with 0.3 ml. of N-caustic soda solution (about 7 equivalents) so that the pH value of the solution is maintained between 10.5 and 11.5. After a further 30 minutes the solution is freed from methanol under vacuum at room temperature, adjusted with 1 N-acetic acid to pH 7.4 and lyophilized. The residual mixture of free peptide and inorganic salts (79 mg.) is fractionated by counter-current distribution in the system butanol/0.1 N-ammonium hydroxide. The pure octapeptide is obtained as a colourless powder which is soluble in water and methanol, more sparingly soluble in ethanol, and insoluble in acetone.

(b) 400 milligrams of crude octapeptide methyl ester (containing about 3 mols HCl+1 mol. NH$_4$Cl) are dissolved in 4 ml. of methanol (clear brown-yellow solution), and, after the addition of 8 ml. of 1 N-solution of potassium carbonate in water, the whole is stirred at room temperature for one hour. Finally the solution, which contains a small amount of brown flocks in the form of a deposit, is neutralised with 4 N-hydrochloric acid to a pH value of 6, then frozen with a mixture of acetone and carbon dioxide, and lyophilized overnight in a high vacuum. There are obtained 930 milligrams of a brownish powder which contains about 590 milligrams of potassium chloride in addition to the peptide.

The whole of the latter powder is distributed through 30 stages in the system n-butanol/0.33 molar NH$_4$COOH (ammonium formate) in water (pH=6.5). Each phase has a volume of 10 cc.

The free octapeptide has a G=0.17 and is isolated from the combined contents of tubes 0–8 by extraction three times with 400 cc. of a mixture of butanol and methanol (3:1) each time, the organic solution is washed twice with 30 ml. of an aqueous solution of ammonium formate of 5% strength each time. After evaporating the mixture at 45° C. under 11 mm. pressure and drying it in a high vacuum for 8 hours at 40° C., there is obtained a total of 190 milligrams of a white powder which is easily soluble in water, and which in biological tests on rats from which the kidneys have been removed exhibits an action 20 times as strong as that of nor-adrenaline.

As tested by paper chromatography the product is unitary, and has an R$_f$-value of 0.19 in the system secondary butanol/ammonia solution of 3% strength (120:44).

As a second fraction there are obtained in the distribution from tubes 18–30 (G=42) 140 milligrams more of non-hydrolyzed starting material (octapeptide methyl ester). R$_f$-value in the above system=0.30.

(c) 500 milligrams of octapeptide methyl ester (same starting material as under (a) above) are dissolved in 2 ml. of concentrated hydrochloric acid, and the mixture is allowed to stand for 100 minutes at 39° C. The solution is then evaporated to dryness in a high vacuum, and the residue is finely pulverized and further dried for a few hours at 0° C. in a high vacuum. There are obtained 510 milligrams of a pale brown crude product, which exhibits in rats deprived of their kidneys 20 times the activity of nor-adrenaline.

For purification 300 milligrams of the above product are dissolved in 2 ml. of water, then neutralized with 2 N-caustic soda solution to a pH value of 6, and distributed through 30 stages in the system n-butanol/methanol/0.33 molar ammonium formate (3:1:4; pH=6.5), the volume of each phase being 10 ml. From tubes 5–14 there are obtained by working up as described under (a) 170 milligrams of hydrolysate in the form of a colorless substance soluble in water, which exhibits in rats deprived of their kidneys 30–25 times the activity of nor-adrenaline. In paper chromatography in the system secondary butanol/ammonia solution of 3% strength (120:44) the product splits up into two compounds having the R$_f$-values 0.13 and 0.19, respectively. The second patch exhibits the greater color intensity with ninhydrin.

The compound having the R$_f$-value 0.13 is L-asparagyl-L-arginyl-L-valyl-L-tyrosyl-L-valyl-L-histidyl-L-prolyl - L-phenylalanine, whereas the compound having the R$_f$-value 0.19 is the octapeptide containing the asparaginyl residue.

Tubes 15–19 of the Craig distribution contain 55 milligrams of mixed fraction, and 22 milligrams of starting material are recovered from tubes 20–29 (R$_f$=0.30).

In addition to being attained by the Craig distribution in a large number of stages, the two hydrolysis products (asparaginyl- and asparagyl-compounds) can also be completely separated from one another by chromatography through a column of paper powder with suitable solvent systems, for example, butanol/methanol/ammonium formate.

EXAMPLE 19

*N-carbobenzyloxy-L-valyl-L-tyrosyl-L-valyl-L-histidyl-L-prolyl-L-phenylalanine methyl ester*

1.95 grams (0.003 mol) of carbobenzyloxy-L-valyl-L-tyrosyl-L-valyl-L-histidine are suspended in 10 ml. of dimethylformamide, and treated with 0.83 gram (0.003 mol) of L-prolyl-L-phenylalanine methyl ester and 0.84 gram (0.0035 mol) of 1-cyclohexyl-3-morpholinyl ethylcarbodiimide. After 1 hour the starting material is completely dissolved. The reaction solution is left to stand overnight at room temperature, then freed from dimethyl-formamide under 0.1 mm. pressure, and the residue is treated with ice water. The separated solid material is wished twice with 2 N-hydrochloric acid, as a result of which the reaction product forms a hydrochloride which is soluble in water but not in 2 N-hydrochloric acid. Re-conversion into the basic form is effected by treatment with 0.5 N-potassium carbonate solution, and the product is washed several times with water and dried under vacuum at 35° C. The resulting crude product (2.40 grams) is taken up in 100 ml. of acetone, filtered from insoluble material (0.30 gram) and evaporated under vacuum. By trituration with ethyl acetate the residue gives 1.57 grams (58%) of solid material melting at 151–156° C.

For further purification, 1 gram of this substance is subjected to counter-current distribution in the system methanol-water 4:1/chloroform-carbon tetrachloride 1:1 over 48 stages. The major quantity of the material (0.84 gram) is present in fractions 15–28 with a weight maximum in fraction 21 (K=0.78). These fractions, after reprecipitation from acetone give 0.66 gram of amorphous material of M.P. 158–162° C. After repeated reprecipitation from a large amount of acetone, the substance has a melting point of 161–163° C. and $$[\alpha]_D^{24} = -56° \pm 2°$$

(c.=1.38 in ethanol).

The carbobenzyloxy-L-valyl-L-tyrosyl-L-valyl-L-histidine used as starting material is prepared as described below (Examples 21–22).

EXAMPLE 20

L-valyl-L-tyrosyl-L-valyl-L-histidyl-L-prolyl-L-phenylalanine methyl ester 635 mg. (0.7 mmol) of carbobenzyloxy-L-valyl-L-tyrosyl-L-valyl-L-histidyl-L-prolyl-L-phenylalanine methyl ester are triturated with 1 ml. of glacial acetic acid until a uniform solution is produced and this is then treated with 1.9 ml. of 1.6 N-hydrobromic acid (3 mmols) in acetic acid. On standing at room temperature, the reaction product commences to separate as an oil after 10 minutes. The mixture is shaken for 2½ hours and then evaporated as far as possible at 30° C. under 0.1 mm. pressure. After washing with ether and acetone, the residue gives 648 mg. of the dihydrobromide of the hexapeptide methyl ester as an almost colorless powder.

For conversion into the free ester, a solution of 562 (0.6 mmol) of this substance in 2 ml. of water is rendered strongly alkaline with saturated potassium carbonate solution at 0° C. and extracted 4 times, each time with 20 ml. of cold chloroform. The chloroform extracts are washed with a little water, dried and evaporated under vacuum. On trituration with ether the oily residue yields 272 mg. (59%) of the peptide ester as a faintly yellow powder which is used as such for further reaction.

EXAMPLE 21

N-carbobenzyloxy-L-valyl-L-tyrosyl-L-valyl-L-histidine methyl ester

A solution of 9.94 grams (0.024 mol) of carbobenzyloxy-L-valyl-L-tyrosine in 100 ml. of acetonitrile is treated with 6.64 grams (0.28 mol) of 1-cyclohexyl-3-morpholinylethyl-carbodiimide and then with 6.5 grams (0.024 mol) of L-valyl-L-histidine methyl ester. After 15 hours the separated reaction product is filtered off and washed with acetonitrile. The crude product (11.2 grams=70%) of M.P. 208–211° C. is dissolved in 500 ml. of hot methanol, the solution is concentrated to 100 ml. and then treated with an equal volume of ether. The separated pure carbobenzyloxy-L-valyl-L-tyrosyl-L-valyl-L-histidine methyl ester melts at 222–224° C. After counter-current distribution in the system methanol-water 4:1/chloroform-carbon tetrachloride 1:1, the substance has a melting point 224–226° C. and $[\alpha]_D^{24}=-31°\pm2°$ (c.=2.09 in glacial acetic acid).

The N-carbobenzyloxy-L-valyl-L-tyrosine used as starting material is obtained according to Examples 23–24 and the L-valyl-L-histidine methyl ester according to Examples 25–26.

EXAMPLE 22

N-carbobenzyloxy-L-valyl-L-tyrosyl-L-valyl-L-histidine

A suspension of 3.32 grams (0.005 mol) of carbobenzyloxy-L-valyl-L-tyrosyl-L-valyl-L-histidine methyl ester in 30 ml. of methanol is mixed at about 10° C. with 15 ml. of N-caustic soda solution, whereupon the starting material rapidly passes into solution. The reaction solution is allowed to stand for 2 hours at room temperature, then freed from methanol under vacuum and, after separation of a few flocks by filtration, acidified with 20 ml. of 2 N-acetic acid. The separated jelly-like material is centrifuged and finally washed with acetone and methanol and dried under vacuum at 40° C. The carbobenzyloxy-L-valyl-L-tyrosyl-L-valyl-L-histidine is obtained in a yield of 2.74 grams (84%) and after washing with boiling methanol melts at 236–238° C.;

$$[\alpha]_D^{23}=-10°\pm2°$$

(c.=2.10 in glacial acetic acid). The substance is insoluble in all the usual organic solvents except dimethylformamide and glacial acetic acid.

EXAMPLE 23

N-carbobenzyloxy-L-valyl-L-tyrosine-ethyl ester

A solution of 50.2 grams (0.2 mol) of carbobenzyloxy-L-valine and 41.8 grams (0.2 mol) of L-tyrosine-ethyl ester in 400 ml. of acetonitrile is mixed with 45.3 grams (0.22 mol) of 1 : 3-di-cyclohexyl-carbodiimide and the whole allowed to stand for 5 hours at room temperature. The precipitated mixture of di-cyclohexylurea and the reaction product is filtered off, and the dipeptide derivative is extracted from this mixture with ethyl acetate. The original reaction solution is evaporated under vacuum, the residue is dissolved in ethyl acetate and the solution so produced is washed with 2 N-hydrochloric acid, 2 N-sodium bicarbonate solution and water, dried and combined with the above ethyl acetate solution of the originally separated reaction product. The residue obtained on evaporation under vacuum crystallizes on the addition of ether and yields 74.5 grams (84%) of carbobenzyloxy-L-valyl-L-tyrosine-ethyl ester of M.P. 142–145° C. By recrystallization from acetone-ether 68.6 grams of pure material of M.P. 148–149° C. are obtained; $[\alpha]_D^{24}=+33°\pm1°$ (c.=3.96 in chloroform).

EXAMPLE 24

N-carbobenzyloxy-L-valyl-L-tyrosine 70.7 grams (0.16 mol) of carbobenzyloxy-L-valyl-L-tyrosine-ethyl ester are dissolved in 300 ml. of methanol and treated while stirring in the course of 15 minutes at about 10° C. with 400 ml. of N-caustic soda solution. The clear reaction solution is allowed to stand for 2 hours at room temperature, then freed under vacuum from methanol and a little solid material filtered off. On acidification of the filtrate with dilute hydrochloric acid, the carbobenzyloxy-L-valyl-L-tyrosine separates in crystalline form and is filtered off, washed with water and dried under vacuum at 50° C.; M.P. 161–163° C.;

$$[\alpha]_D^{22}=+26°\pm1° \text{ (c.=4.01 in pyridine)}$$

The yield amounts to 64.01 grams (97%).

EXAMPLE 25

N-carbobenzyloxy-L-valyl-L-histidine methyl ester

A solution of 25.1 grams (0.1 mol) of carbobenzyloxy-L-valine and 16.7 grams (0.1 mol) of L-histidine methyl ester in 100 ml. of acetonitrile is mixed at about 10° C. with 26.1 grams of 1-cyclohexyl-3-morpholinylethyl-carbodiimide (0.11 mol) and the whole allowed to stand at room temperature. After about 1 hour the separation commences of a gelatinous product which after 15 hours is filtered and washed with acetonitrile; 30.8 grams (77%); M.P. 152-156° C. The carbobenzyloxy-L-valyl-L-histidine methyl ester melts at 161–163° C. after recrystallization from acetone-ether; $[\alpha]_D^{23}=-22°\pm2°$ (c.=2.04 in ethanol).

EXAMPLE 26

L-valyl-L-histidine methyl ester 10 grams (0.025 mol) of carbobenzyloxy-L-valyl-L-histidine methyl ester are dissolved in 100 ml. of methanol, treated with a solution of 0.03 mol of hydrochloric acid gas in methanol and hydrogenated at room temperature and under normal pressure in the presence of 2 grams of palladium charcoal (10% Pd), carbon dioxide formed being simultaneously absorbed in caustic soda solution. When the calculated quantity of hydrogen has been taken up the hydrogenation ceases after 1 hour. The catalyst is filtered off and the reaction solution evaporated under vacuum. The hydrochloride of the base, obtained as an oil (8.7 grams), is dissolved in a little water and after covering with a layer of ethyl acetate is rendered strongly alkaline by shaking at 0° C. with saturated potassium carbonate solution. The ethyl acetate phase containing the reaction product is dried and evaporated under vacuum and the L-valyl-L-histidine methyl ester (6.5 grams) obtained as an oily residue, is used directly for further reaction.

EXAMPLE 27

*N-carbobenzyloxy-L-asparaginyl - nitro-L-arginyl-L-valyl-L-tyrosyl-L-leucyl-L-histidyl-L-prolyl-L - phenylalanine methyl ester*

760 milligrams (0.96 millimol) of L-valyl-L-tyrosyl-L-leucyl-L-histidyl-L-prolyl-L-phenylalanine methyl ester and 1.35 grams (2.88 millimols) of N-carbobenzyloxy-L-asparaginyl-nitro-L-arginine in 10 ml. of dimethyl-formamide are mixed with 690 milligrams (2.9 millimols) of 1-cyclohexyl-3-(morpholinyl-ethyl)-carbodiimide and the whole is allowed to react for 2 days at room temperature. The dimethyl-formamide is then removed in a high vacuum and the residual oil is triturated five times with 5 ml. of water each time while cooling with ice, whereby partial flocculation occurs.

The crude product, 2.4 grams, is purified by repeated washing with a large quantity of ice-cold acetone and methanol, and 250 milligrams of carbobenzyloxy-octapeptide ester are obtained. From the acetone extracts and methanol extracts a further 180 milligrams of carbobenzyloxy-octapeptide ester is obtained.

The crude carbobenzyloxy-L-asparaginyl-nitro-L-arginyl-L-valyl-L-tyrosyl-L-leucyl-L-histidyl-L-prolyl-L-phenylalanine methyl ester (430 milligrams) melts at 175–190° C. and is used as such for further working up.

The L-valyl-L-tyrosyl-L-leucyl-L-histidyl - L - prolyl-L-phenylalanine methyl ester used as starting material can be prepared as described below in Examples 30 and 31.

EXAMPLE 28

*L-asparaginyl-L-arginyl-L-valyl-L-tyrosyl-L-leucyl-L-histidyl-L-prolyl-L-phenylalanine methyl ester*

410 milligrams (0.33 millimol) of carbobenzyloxy-asparaginyl - nitro-L-arginyl-L-valyl-L-tyrosyl-L-leucyl-L-histidyl-L-prolyl-L-phenylalanine methyl ester are suspended in 10 ml. of methanol, and brought into solution by the addition of 1 ml. of 1.39 N-methanolic hydrochloric acid (4 equivalents). The flocculent impurities are filtered off, and the solution is hydrogenated in the presence of 250 milligrams of palladiumcharcoal (10% of palladium) under normal conditions. The carbon dioxide formed is absorbed in a second hydrogenation vessel with dilute caustic soda solution. The hydrogenation ceases after 4½ hours when somewhat more than the calculated quantity of hydrogen has been absorbed. The catalyst is filtered off and the solution is evaporated to dryness in vacuo at 40° C. There are obtained 360 milligrams of a resin (406 milligrams calculated for the trihydrochloride and the equimolecular amount of ammonium chloride).

The product is worked up without further purification. It dissolves well in water and methanol.

EXAMPLE 29

*L-asparaginyl-L-arginyl-L-valyl-L-tyrosyl-L-leucyl-L-histidyl-L-prolyl-L-phenylalanine*

360 milligrams of crude L-asparaginyl-L-arginyl-L-valyl - L - tyrosyl-L-leucyl-L-histidyl-L-prolyl-L-phenylalanine ester trihydrochloride are dissolved in 10 mol of methanol of 66% strength and a 1/10 N-solution of caustic soda is added in portions so as to maintain the pH value of the solution at 10.5–11 for 20 minutes. (Total consumption of the caustic soda solution=18.5 ml.) The solution is brought to a pH value of 7–8 with solid carbon dioxide, and the separated impurities (10–20 milligrams) are filtered off, the methanol is evaporated to a far-reaching extent at 35° C. in vacuo, and the pH value of the solution is adjusted to 9 with a 2 N-solution of sodium carbonate.

The aqueous solution is extracted four times with 100 ml. of n-butanol saturated with water each time, the butanol extracts are washed once with 10 ml. of sodium sulfate solution and dried over sodium sulfate. The residue obtained by evaporation is washed three times with 3 ml. of dry butanol each time, whereby 50 milligrams of easily soluble constituents are removed.

There are obtained 190 milligrams of L-asparaginyl-L - arginyl-L-valyl-L-tyrosyl-L-leucyl-L-histidyl-L-prolyl-L-phenylalanine in the form of a fine light grey powder which dissolves well in water and methanol.

In tests on rats a sample of the crude product exhibits the same strong activity as noradrenaline.

EXAMPLE 30

*L-asparagyl-L-arginyl-L-valyl-L-tyrosyl-L-leucyl-L-histidyl-L-prolyl-L-phenylalanine*

2.08 grams (1.75 millimols) of L-asparaginyl-L-arginyl - L-valyl-L-tyrosyl-L-leucyl-L-histidyl-L-prolyl-L-phenylalanine methyl ester trihydrochloride (see Example 28), which has been reprecipitated once from a mixture of methanol and acetone, are heated in concentrated hydrochloric acid at 57° C. for 85 minutes. In about 10–15 minutes a clear solution is obtained. The hydrochloric acid is rapidly evaporated under reduced pressure at 25° C., and the residue is dried in a high vacuum over potassium hydroxide and phosphorous pentoxide.

The yield is 2 grams of amorphous L-asparagly-L-arginyl - L- valyl-L-tyrosyl-L-leucyl-L-histidyl-L-prolyl-L-phenylalanine trihydrochloride, which is still contaminated with ammonium chloride.

1.26 grams of the crude product are dissolved in 20 ml. of ethanol, and the peptide is again precipitated with 120 ml. of acetone. Two further reprecipitations yield 1.08 grams of white granular octapeptide trihydrochloride. In tests on animals the unprecipitated product exhibits the same activity as nor-adrenaline (test according to Peart) and double the activity in the case of rats deprived of their kedneys.

A test portion (200 milligrams) of the reprecipitated L - asparagyl - L-arginyl-L-valyl-L-tyrosyl-L-leucyl-L-histidyl-L-prolyl-L-phenylalanine trihydrochloride is distributed by the method of Craig in 30 stages between n-butanol and 0.3 cc. of ammonium acetate (1:1). (pH= 6.5–7.)  G=0.67. The solutions are evaporated in vacuo at 40° C., and the ammonium acetate is sublimed in a high vacuum at 40° C. for 30 minutes.

Fractions 7–16 (maximum in fraction 12) exhibit the same activity in the Peart test as the non-distributed product.

Determinations of ammonia and total nitrogen show that the asparagine is hydrolysed mainly to asparaginic acid in the acid hydrolysis.

EXAMPLE 31

*N-carbobenzyloxy-L-valyl-L-tyrosyl-L-leucyl-L-histidyl-L-prolyl-L-phenylalanine methyl ester*

A solution of 2.1 grams (0.005 mol) of N-carbobenzyloxy-L-valyl-L-tyrosine in 10 ml. of dry acetonitrile is treated with 1.16 grams (5% excess) of dicyclohexyl-carbodiimide and a solution of 2.68 grams (0.005 mol) of L-leucyl-L-histidyl-L-prolyl-L-phenylalanine methyl ester in 10 ml. of acetonitrile. As a result, the dicyclohexyl urea separates out momentarily. After about 5 hours the separation commences as a gelatinous mass of the N-carbobenzyloxy-hexapeptide ester. The whole is allowed to stand for 20 hours at room temperature and then the acetonitrile evaporated off at 40° C. under reduced pressure. The evaporation residue is digested with 10 ml. of ice cold methanol and washed five times further, in each case with 1 ml. of cooled methanol. The methanol is evaporated under vacuum and the residue taken up in chloroform and washed three times with 2 N-hydrochloric acid (the first time with 5 ml. and subsequently twice with 2 ml.), five times each time with 2 ml. of ice cold sodium bicarbonate solution and then until neutral with water. The solution, dried over sodium sulfate, is concentrated to one half and boiled for a short time with active charcoal.

Complete evaporation of the solvent gives 4.2 grams of crude N-carbobenzyloxy-hexapeptide ester which is still contaminated with a little dicyclohexyl urea. The crude carbobenzoxy ester is dissolved in a little cold acetone, filtered off from residual dicyclohexyl urea and reprecipitated with much ether.

3.7 grams (79%) of N-carbobenzyloxy-L-valyl-L-tyrosyl-L-leucyl-L-histidyl-L-prolyl-L-phenylalanine methyl ester are obtained.

The substance prepared for analysis, after two further purifications from acetone/ether, has a melting point 142–147° C./149° C.; $[\alpha]^{24}_D = -60° \pm 4°$ (c.=1.291 in methanol).

The L-leucyl-L-histidyl-L-prolyl-L-phenylalanine methyl ester can be prepared as described in Example 32 below.

EXAMPLE 32

*L-valyl-L-tyrosyl-L-leucyl-L-histidyl-L-prolyl-L-phenylalanine methyl ester*

To 970 mg. (~ 0.001 mol) of N-carbobenzyloxy-L-valyl-L-tyrosyl-L-leucyl-L-histidyl-L-prolyl-L-phenylalanine methyl ester are added 6 ml. of an approximately 2 N-solution of hydrogen bromide in glacial acetic acid. As a result the substance agglomerates to a sticky mass. After stirring for one hour with a Magnet stirrer, clear solution occurs; reaction is allowed to continue for a further hour at room temperature, the glacial acetic acid is then evaporated under vacuum at 40° C. and the residue is ground twice with absolute ether. The granular dihydrobromide of L-valyl-L-tyrosyl-L-leucyl-L-histidyl-L-prolyl-L-phenylalanine methyl ester is dissolved in 10 ml. of water, the aqueous solution extracted once with a little ethyl acetate, the ethyl acetate phase washed once with 2 ml. of water and the combined aqueous solutions freed under vacuum from dissolved ethyl acetate. The cooled solution is adjusted to pH 8 with 2 N-sodium bicarbonate solution, filtered from separated hexapeptide ester and washed until neutral with ice water. The dried product (730 mg.=89%) melts at 130–140° C. and can be purified from chloroform/ether. $[\alpha]^{24}_D = -53° \pm 4°$ (c.=0.636 in methanol).

EXAMPLE 33

*N-carbobenzyloxy-L-leucyl-L-histidyl-L-prolyl-L-phenylalanine methyl ester*

A solution of 6.6 grams (0.0158 mol) of N-carbobenzyloxy-L-leucyl-L-histidine hydrazide (obtained as described in Example 34 below) in 50 ml. of N-hydrochloric acid is extracted once with a little ethyl acetate, the ethyl acetate solution washed with 5 ml. of N-hydrochloric acid and the combined hydrochloric acid solutions covered with a layer of fresh ethyl acetate and cooled to 0° C. Slow treatment is then carried out with a solution, cooled to 0° C., of 1.14 grams (0.0165 mol) of sodium nitrite in 5 ml. of water, the whole is left for 5 minutes and the hydrochloric acid azide solution rendered alkaline to phenolphthalein with 9 ml. of saturated sodium carbonate solution. The aqueous phase is extracted twice further, with ice cooling, with much ethyl acetate and then the ethyl acetate solutions washed until neutral with water and dried over sodium sulfate.

From 5 grams (0.016 mol) of L-prolyl-L-phenylalanine methyl ester hydrochloride, suspended in 50 ml. of dry ethyl acetate, by the addition of 2.25 ml. (0.0162 mol) of triethylamine a solution of the free L-prolyl-L-phenylalanine methyl ester is obtained. This solution is cooled to 0° C. and treated with the azide solution prepared as described above.

After 18 hours' standing at 0–5° C. and 2 hours at room temperature, one third of the solvent is evaporated off under vacuum at 40° C. and the residue is washed with N-hydrochloric acid, ice cold 2 N-sodium carbonate solution and until neutral with water. The hydrochloric acid, sodium carbonate and water extracts are again washed with much ethyl acetate in two further separating funnels.

After the evaporation of the ethyl acetate, 9.17 grams (87%) of N-carbobenzyloxy-L-leucyl-L-histidyl-L-prolyl-L-phenylalanine methyl ester are obtained as an amorphous powder.

The multiplicative distribution over thirty six stages by the Craig method of 1.32 grams of carbobenzyloxy-tetrapeptide ester between 80% methanol and chloroform : carbon tetrachloride 1 : 1 gives 1.2 grams of pure product. A preparation for analysis, after a single recrystallization from methanol-water, has a M.P. 110–115° C. $[\alpha]_D^{24} = -57° \pm 4°$ (c.=1.031 in methanol).

The N-carbobenzyloxy-L-leucyl-L-histidyl-L-prolyl-L-phenylalanine methyl ester is of good solubility in alcohol, methanol, acetone, ethyl acetate and quite dilute hydrochloric acid; it is insoluble in petroleum ether and ether.

EXAMPLE 34

*L-leucyl-L-histidyl-L-prolyl-L-phenylalanine methyl ester*

3.4 grams (0.005 mol) of carbobenzyloxy-L-leucyl-L-histidyl-L-prolyl-L-phenylalanine methyl ester in 30 ml. of absolute methanol are hydrogenated, with the addition of two equivalents of methanolic hydrochloric acid in the presence of 600 mg. of palladium charcoal (10% Pd) at room temperature until the reaction comes to a standstill. After about 1¾ hours a little more than the calculated quantity of hydrogen has been taken up. The catalyst is filtered off and the solution evaporated under vacuum at 40° C. The residue is dissolved in 5 ml. of ice cold water, covered with a layer of 50 ml. of cooled chloroform and rendered alkaline to phenolphthalein with saturated potassium carbonate solution. The aqueous solution is extracted twice further with 20 ml. of chloroform each time, the organic phases being washed with concentrated sodium sulfate solution and dried over sodium sulfate. After evaporation of the solvent 2.68 grams of amorphous tetrapeptide ester remain which can be used directly for further reaction.

EXAMPLE 35

*N-carbobenzyloxy-L-leucyl-L-histidine hydrazide*

10 grams (0.024 mol) of N-carbobenzyloxy-L-leucyl-L-histidine methyl ester (obtained according to Example 36 below), dissolved in 40 ml. of absolute ethanol, are treated with 3 ml. of hydrazine hydrate and reaction allowed to proceed for 2 days at room temperature. The solvent is evaporated at 40° C. under vacuum and the residue ground with 100 ml. of water. After 3 hours' standing at 0° C., the liquid is filtered from crystalline precipitate, portions of 20 ml. of water are used for washing and the crude hydrazide is dried over sulfuric acid and $P_2O_5$.

Crystallization from 100 ml. of boiling water gives 6.8 grams (68%) of pure carbobenzyloxy-L-leucyl-L-histidine hydrazide, M.P. 168–169° C., $[\alpha]_D^{22} = -27° \pm 4°$ (c.=0.808 in methanol) and $[\alpha]_D^{22} = -52° \pm 4°$ (c.=0.733 in N—HCl).

The hydrazide is of good solubility in cold ethanol and methanol and in cold N-hydrochloric acid but is only soluble in warm acetone and insoluble in ethyl acetate.

EXAMPLE 36

*N-carbobenzyloxy-L-leucyl-L-histidine methyl ester*

To a solution of 16.9 grams (0.1 mol) of L-histidine methyl ester and 21.6 grams (0.105 mol) of dicyclohexylcarbodiimide in 100 ml. of absolute ethyl acetate and 20 ml. of acetonitrile are added all at once 26.5 grams (0.1 mol) of N-carbobenzyloxyl-L-leucine, dissolved in 200 ml. of ethyl acetate and the mixture, which soon solidifies to a jelly, is shaken for 30 minutes at room temperature. After leaving to stand overnight, the solvent is withdrawn as well as possible by suction from the friable mass (with repeated rubbing of the filter residue with a little fresh ethyl acetate) and dried under vacuum at 90° C. 47.8 grams are obtained of a mixture of dicyclohexyl urea and dipeptide, from which the latter is dissolved out using three portions of 50 ml. each of cold methanol. The combined extracts still contain small quantities of dicyclohexyl urea and are purified by dissolving in methanol and repeated precipitation with ethyl acetate-petroleum ether. 29.3 grams are obtained of N-carbobenzyloxy-L-leucyl-L-histidine methyl ester (70.5% of the theoretical yield) of M.P. 131–132° C.

From the filtrate of the reaction mixture, by extraction with 2 N-hydrochloric acid, 4.0 grams of dipeptide (9.5% of the theoretical yield) of M.P. about 120–125° C. are also obtained, which can be further purified by reprecipitation from methanol-ethyl acetate-petroleum ether.

EXAMPLE 37

N-carbobenzyloxy-L-asparaginyl - ($N_\epsilon$ - carbobenzyloxy)-L-lysyl-L-valyl-L-tyrosyl-L-leucyl - L - histidyl-L-prolyl-L-phenylalanine methyl ester 330 mg. (0.42 m.mol) of L-valyl-L-tyrosyl-L-leucyl-L-histidyl-L-prolyl-L-phenylalanine methyl ester (see Example 32) and 445 mg. (0.84 mmol) of N-carbobenzyloxy-L-asparaginyl-($N_\epsilon$-carbobenzyloxy)-L-lysine (see Example 41 below) are dissolved in 3 cc. of dimethyl formamide, 200 mg. (0.84 mmol) of 1-cyclohexyl-3-morpholinylethyl-carbodiimide added and the reaction mixture left for 21 hours at 22° C. The whole is then evaporated under high vacuum at 45° C. to dryness and the residual oil washed with small portions of water, very dilute ammonia solution and water, as a result of which it gradually solidifies. The powder is filtered with suction, dried (520 mg.) and further washed with acetone and finally with methanol, whereby N-carbobenzyloxy-L-asparaginyl-($N_\epsilon$-carbobenzyloxy) - L-lysyl-L-valyl-L-tyrosyl-L-leucyl-L-histidyl-L-prolyl-L-phenylalanine methyl ester is obtained in the form of a grey, methanol-insoluble powder. M.P. about 190–205° C. The powder is dissolved in dimethyl formamide and precipitated with ether whereby 130 mg. of flakes are obtained of M.P. 210–215° C. Yield 24% of the theoretical. The protected octapeptide is difficultly soluble in most customary solvents but easily soluble in dimethyl formamide.

The L-valyl-L-tyrosyl-L-leucyl-L-histidyl - L - prolyl-L-phenylalanine methyl ester used as starting material is prepared as described in Example 32.

EXAMPLE 38

L-asparaginyl-L-lysyl - L - valyl-L-tyrosyl-L-leucyl-L-histidyl-L-prolyl-L-phenylalanine methyl ester trihydrobromide 53 mg. (41 μmol) of N-carbobenzyloxy-L-asparaginyl-($N_\epsilon$-carbobenzyloxy) - L-lysyl-L-valyl-L-tyrosyl-L-leucyl-L-histidyl-L-prolyl-L-phenylalanine methyl ester of M.P. 210–215° C. are treated with 0.3 cc. of 2.5 N HBr in glacial acetic acid and the mixture maintained for 1½ hours at 21° C. with exclusion of moisture, whereby the material slowly passes into solution. Finally the HBr-glacial acetic acid mixture is completely removed under high vacuum at 25° C. bath temperature and the residual resin washed with acetones as a result of which a granular powder is produced. The extremely hygroscopic product is filtered with suction and washed with a little acetone. After drying, 50 mg. of crude L-asparaginyl-L-lysyl-L-valyl-L-tyrosyl-L-leucyl - L - histidyl-L-prolyl-L-phenylalanine methyl ester trihydrobromide of M.P. about 180–220° (with decomposition) are obtained. The crude product is worked up without further purification.

EXAMPLE 39

L-asparaginyl-L-lysyl-L-valyl - L - tyrosyl-L-leucyl-L-histidyl-L-prolyl-L-phenylalanine 34 mg. (27 μmol) of L-asparaginyl-L-lysyl-L-valyl-L-tyrosyl-L-leucyl-L-histidyl-L-prolyl-L-phenylalanine methyl ester trihydrobromide of M.P. 180–220° C. are dissolved in 1 cc. of methanol and 0.1 N-sodium hydroxide solution added dropwise until the pH value of the solution remains at 10–10.5 for 15 minutes. A total quantity of 1.81 cc. of 0.1 N NaOH are required (6.7 equivalents). Then, by blowing in $CO_2$ the pH is brought to 8, whereupon the methanol is removed under vacuum, the pH of the aqueous solution is brought to 8.5 to 9.0 by addition of a little sodium carbonate solution and the aqueous solution is extracted with 3 portions of n-butanol saturated with water (30, 20, 20 cc.). The butanol extracts are washed once with 3 cc. of ½ saturated $Na_2SO_4$ solution, dried with sodium sulfate and give on evaporation 18 mg. of crude L-asparaginyl-L-lysyl-L-valyl-L-tyrosyl-L-leucyl-L-histidyl-L-prolyl-L-phenylalanine as a colorless, fine-grained residue. The crude product is taken up in water by treatment 3 times with 3 cc. each time, whereby 4 mg. of impurity difficultly soluble in water can be separated. The aqueous solutions are combined and evaporated and give 14 mg. of residue. This is washed 3 times with dry n-butanol, using 1 cc. each time, whereby a further 1 mg. of fractions more easily soluble in n-butanol can be removed.

On testing for blood pressure raising effect upon rats, the product shows an immediate, distinct increase of the blood pressure, similar to hypertension when applied to rats from which the kidneys have been removed. Compared with noradrenaline the strength of the effect is about 1/10 to 1/15.

EXAMPLE 40

N-carbobenzyloxy-L-asparaginyl-($N_\epsilon$-carbobenzyloxy)-L-lysine methyl ester To a solution, cooled to 0° C., of 12.0 grams (0.041 mol) of $N_\epsilon$-carbobenzyloxy-L-lysine methyl ester and 8.6 cc. (0.061 mol) of triethylamine in 60 cc. of absolute toluene is added dropwise within 15 minutes with exclusion of moisture a solution likewise cooled to 0° C. of 7.4 grams of 90% diethyl chlorophosphite (0.048 mol) in 20 cc. of absolute toluene. The reaction mixture is then maintained for 2 hours at room temperature whereupon filtration with suction from separated triethylamine hydrochloride follows, then washing with a little absolute toluene and the toluene filtrate is evaporated to dryness under vacuum, whereby the diethyl phosphite amide of the $N_\epsilon$-carbobenzyloxy-L-lysine methyl ester is obtained as a viscid resin (weight 17.0 grams). It is dissolved in 60 cc. of diethyl phosphite, 10.9 grams of dry, finely powdered N-carbobenzyloxy-L-asparagine (0.041 mol) added and the mixture heated for 1 hour to 80° C., whereby the N-carbobenzyloxy-L-asparagine passes into solution in a few minutes. After 1 hour, the diethyl phosphite is completely distilled off under reduced pressure, the residual resin taken up in much ethyl acetate and the ethyl acetate solution washed with dilute hydrochloric acid, water, dilute sodium carbonate solution and water. The ethyl acetate phase, after drying with sodium sulfate and evaporation, leaves 13.0 grams of crude N-carbobenzyloxy-L-asparaginyl-($N_\epsilon$-carbobenzyloxy-) - L-lysine methyl ester as a gelatinous mass. After reprecipitation twice from methanol-ether, 8.5 grams of the product are obtained as a flocculent precipitate; M.P. 152–161° C.; yield 38% of the theoretical yield.

EXAMPLE 41

N-carbobenzyloxy-L-asparaginyl-($N_\epsilon$-carbobenxyloxy)-L-lysine 5.00 grams (0.0092 mol) of N-carbobenzyloxy-L-asparaginyl-($N_\epsilon$-carbobenzyloxy)-L-lysine methyl ester of M.P. 152–161° C. are dissolved in 60 cc. of dimethyl formamide and 0.1 N-caustic soda solution added in portions until the pH value of the solution remains at 10–10.5 for 20 minutes (a total quantity of 140 cc. of 0.1 N NaOH added). Then by the addition of a little solid $CO_2$ the pH value is brought to 8 and the dimethyl formamide-water mixture concentrated first under vacuum and then under high vacuum to a small volume. The residue is treated with water whereby the sodium salt of N - carbobenzyloxy-L-asparaginyl - (Nε - carbobenzyloxy)-L-lysine is precipitated as a thick, gelatinous mass. It is brought into solution by the addition of much water (about 200 cc.) filtered from insoluble matter and the filtrate brought to pH=1 by dropwise addition of concentrated hydrochloric acid with ice cooling. The flocculent precipitate is filtered with suction, washed with ice water, dried and recrystallized twice from methanol-ether. 3.2 grams are obtained of N-carbobenzyloxy-L-asparaginyl-(Nε-carbobenzyloxy)-L-lysine (fine needles) of M.P. 175–181° C. (yield 74% of the theoretical yield). The product is soluble in very dilute alkalies; with 2 N-sodium hydroxide solution or sodium carbonate solution, a gelatinous, difficultly soluble sodium salt is produced.

EXAMPLE 42

N - carbobenzyloxy - L - asparaginyl - nitro - L - arginyl-L - leucyl - L tyrosyl - L - isoleucyl - L - histidyl - L-prolyl-L-phenylalanine methyl ester To a solution of 802 mg. (1 mmol) of L-leucyl-L-tyrosyl - L - isoleucyl - L - histidyl - L - prolyl - L-phenylalanine methyl ester (see Example 48 below) in 6 ml. of freshly distilled dimethyl formamide are added 360 mg. (1.5 mmols) of dicyclohexyl-carbodiimide and after a short time 710 mg. (1.5 mmols) of N-carbobenzyloxy-L-asparaginyl-nitro-L-arginine (see Example 2) in 6 mg. of dimethyl formamide. Reaction is allowed to continue overnight at room temperature followed by filtration from dicyclohexyl urea and evaporation of the solvent under high vacuum at 40° C. The foamy residue is dried for a further hour at 40° C. under 0.01 mm. pressure and is then ground with much ethyl acetate and the pulverulent product dried again under high vacuum. For further purification, the crude product is repeatedly washed with much acetone and ice cold methanol. 280 mg. (22%) are obtained of N-carbobenzyloxy-octapeptide methyl ester; M.P. 204–206° C.

EXAMPLE 43

L - asparaginyl - L - arginyl - L - leucyl - L - tyrosyl - L-isoleucyl - L - histidyl-L-prolyl-L-phenylalanine methyl ester-trihydrochloride 210 mg. (0.22 mmol) of N-carbobenzyloxy-L-asparaginyl - nitro - L - arginyl - L - leucyl - L - tyrosyl - L - isoleucyl-L-histidyl-L-prolyl-L-phenylalanine methyl ester are hydrogenated under normal conditions in 30 ml. of absolute methanol in the presence of four equivalents of hydrochloric acid and 200 mg. of palladium charcoal (10% Pd). (The $CO_2$ formed is absorbed in dilute caustic soda solution in a second hydrogenating vessel.) After about 17 hours, somewhat more than the calculated quantity of hydrogen has been taken up. The catalyst is filtered off, the solution evaporated at 40° C. to a small volume and much ether added. By this means the trihydrochloride of the octapeptide ester separates together with ammonium chloride as a white granular product. Yield 240 mg. (270 mg. calculated for trihydrochloride and equimolar quantity of ammonium chloride).

The product is worked up further without additional purification. It is of good solubility in methanol, ethanol and water.

EXAMPLE 44

L-asparagyl-L-arginyl-L-leucyl-L-tyrosyl-L-isoleucyl-L-histidyl-L-prolyl-L-phenylalanine 100 mg. of L-asparaginyl-L-arginyl-L-leucyl-L-tyrosyl-L-isoleucyl-L-histidyl-L-prolyl - L - phenylalanine methyl ester in 2 ml. of pure concentrated hydrochloric acid are maintained for 85 minutes at 37° C. The hydrochloric acid is rapidly vaporized off under vacuum at 25° C. and the residue dried over sodium hydroxide and phosphorus pentoxide.

For purification, the foamy crude product is dissolved with gentle heating in 1.5 ml. of ethanol and the octapeptide trihydrochloride precipitated with 8 ml. of acetone. Centrifuging and washing of the residue with two portions each of 2 ml. of acetone give 90 mg. of L-asparagyl - L - arginyl - L - leucyl - L - tyrosyl - L - isoleucyl - L-histidyl-L-prolyl-L-phenylalanine trihydrochloride.

This substance exhibits 20 times the activity of noradrenaline when applied to rats from which the kidneys have been removed.

By Craig-distribution of chromatography on paper powder in suitable solvent mixtures (for example butanol-methanol-0.33 molar $NH_4$—COOH or secondary butanol-3% $NH_3$ 120:44) L-asparagyl-L-arginyl-L-leucyl-L - tyrosyl - L - isoleucyl - L - histidyl - L - prolyl - L-phenylalanine can be separated from L-asparaginyl-L-arginyl - L - leucyl - L - tyrosyl - L - isoleucyl - L-histidyl-L-prolyl-L-phenylalanine.

EXAMPLE 45

N-carbobenzyloxy-L-leucyl-L-tyrosine methyl ester 940 mg. (3.5 mmols) of N-carbobenzyloxy-L-leucine are dissolved in 10 ml. of absolute tetrahydrofurane, 800 mg. (10% excess) of dicyclohexyl-carbodiimide are added and then 690 mg. (3.5 mmols) of tyrosine methyl ester dissolved in 15 ml. of absolute tetrahydrofurane. Reaction is allowed to proceed overnight followed by filtration from separated dicyclohexyl urea and evaporation of the solvent under vacuum at 40° C. The evaporation residue in ethyl acetate is washed with N-hydrochloric acid, water, 2 N-sodium bicarbonate solution and with water until neutral and the ethyl acetate solution dried over sodium sulfate and the solvent evaporated under vacuum. 1.4 grams (90%) of crude carbobenzoxy-dipeptide ester are isolated. Reprecipitation twice of the crude ester from ethyl acetate-petroleum ether gives pure, but amorphous N - carbobenzyloxy-L-leucyl-L-tyrosine methyl ester. $[\alpha]_D^{22} = -14° \pm 4°$ (c.=1.108 in methanol).

The same carbobenzyloxy-L-leucyl-L-tyrosine methyl ester, prepared by the mixed anhydride method has the value $[\alpha]_D^{22} = -11° \pm 2°$ (c.=1.631 in ethanol).

EXAMPLE 46

N-carbobenzyloxy-L-leucyl-L-tyrosine

To 2.37 grams (5.3 mmols) of N-carbobenzyloxy-L-leucyl-L-tyrosine methyl ester are added 13.5 ml. of N NaOH, the whole is shaken until complete solution occurs (5 minutes) and hydrolysis is carried out for 1 hour at room temperature. The alkaline solution is extracted once with 5 ml. of ethyl acetate, the organic phase washed once with a little water and the combined aqueous solutions freed from ethyl acetate by treatment under vacuum for 10 minutes. The carbobenzoxy-dipeptide is precipitated with 13.5 ml. of N HCl as a sticky mass which solidifies in a refrigerator but melts again at room temperature. The mother liquor is removed by decantation and the rubber-like residue is well washed with water three times and dried over caustic potash and phosphorus pentoxide under high vacuum. 1.9 grams (80%) of amorphous carbobenzyloxy-L-leucyl-L-tyrosine are obtained, which could not be crystallized. Multiplicative distribution (Craig original process) over 30 stages between 80% methanol as upper phase and chloroform : carbon tetrachloride 1 : 1 as lower phase (K=1.54)

likewise does not give a crystalline product.

EXAMPLE 47

*N-carbobenzyloxy-L-leucyl-L-tyrosyl-L-isoleucyl-L-histidyl-L-prolyl-L-phenylalanine methyl ester*

A solution of 1.03 grams (2.4 mmols) of N-carbobenzyloxy-L-leucyl-L-tyrosine in 10 ml. of dry acetonitrile is treated with 520 mg. (5% excess) of dicyclohexyl-carbodiimide and a solution of 1.38 grams (2.5 mmols) of L-isoleucyl-L-histidyl-L-prolyl-L-phenylalanine methyl ester (see Example 15) in 10 ml. of acetonitrile. As a result the dicyclohexyl urea separates out momentarily. After about 6 hours the separation of the N-carbobenzoxy-hexapeptide ester commences as a gelatinous mass. The whole is allowed to stand for 2 days at room temperature in the dark and then the acetonitrile is evaporated off at 40° C. under reduced pressure. The residue is digested with 5 ml. of ice cold methanol, filtered from dicyclohexyl urea with washing 3 further times with 1 ml. each time of ice cold methanol. The methanol is evaporated under vacuum and the residue taken up in chloroform and washed 3 times with 2 ml. of 2 N-hydrochloric acid, 5 times with 2 ml. of ice cold sodium bicarbonate solution and with water.

The solution, dried over sodium sulfate, is boiled for a short time with a little active charcoal, filtered and the chloroform completely evaporated. A single reprecipitation from chloroform/ether gives 1.7 grams (78%) of carbobenzoxyhexapeptide methyl ester.

A preparation for analysis, after reprecipitation 3 times from chloroform/ether melts at 139–141° C.;

$$[\alpha]_D^{22} = -51° \pm 4°$$

(c.=1.87 in methanol).

EXAMPLE 48

*L-leucyl-L-tyrosyl-L-isoleucyl-L-histidyl-L-prolyl-L-phenylalanine methyl ester*

1.2 grams (1.28 mmols) of N-carbobenzyloxy-L-leucyl-L-tyrosyl-L-isoleucyl-L-histidyl-L-prolyl - L - phenylalanine methyl ester are hydrogenolytically split up in 20 ml. of absolute methanol, containing 2 equivalents of hydrochloric acid, in the presence of 300 mg. of Pd-charcoal (10% Pd). After 2 hours, somewhat more than the calculated quantity of hydrogen has been taken up. The solution, freed from catalyst, is evaporated to dryness under vacuum at 40° C., the residue is dissolved in 10 ml. of ice cold water and to the clear solution 2.6 mmols of sodium carbonate, dissolved in 10 ml. of water, are added. The separated hexapeptide ester is extracted first with 25 ml. and then twice with 10 ml. of n-butanol/chloroform 1 : 1, and the aqueous phases washed 3 times with 5 ml. of water, dried over sodium sulfate and concentrated under vacuum to a small volume. By addition of much ether, the hexapeptide ester is precipitated quantitatively. A single reprecipitation from chloroform/ether gives 840 mg. (81%) of amorphous product of M.P. 130–140° C. The product is sufficiently pure for further working up.

What is claimed is:

1. A process for the preparation of octapeptides which comprises reacting N-carbobenzyloxy-L-asparaginyl-nitro-L-arginyl-L-valyl-L-tyrosine, in the presence of 1-cyclohexyl-3-morphlinylethyl carbodiimide, with an L-isoleucyl-L-histidyl - L - prolyl-L-phenylalanine lower alkyl ester, splitting off with hydrogen in the presence of a palladium catalyst the carbobenzyloxy group from the asparaginyl residue and the nitro group from the arginyl residue of the resulting octapeptide ester and hydrolyzing the ester group of said octapeptide ester by means of caustic soda solution to yield L-asparaginyl-L-arginyl-L-valyl-L-tyrosyl-L-isoleucyl-L-histidyl - L - prolyl-L-phenylalanine.

2. The process of claim 1 wherein the N-carbobenzyloxy-L-asparaginyl-nitro - L - arginyl-L-valyl-L-tyrosine is prepared by reacting N-carbobenzyloxy-L-asparaginine with the methyl phosphite amide of a nitro-L-arginine lower alkyl ester to form N-carbobenzyloxy-L-asparaginyl-nitro-L-arginine lower alkyl ester, hydrolyzing the resulting dipeptide ester by means of caustic soda solution to yield the free acid, reacting said free acid in the presence of 1:3-dicyclohexyl carbodiimide with an L-valyl-L-tyrosine lower alkyl ester, hydrolyzing the resulting tetrapeptide ester with caustic soda solution to yield the free acid.

3. A process for the preparation of octapeptides which comprises reacting N-carbobenzyloxy-L-valyl-L-tyrosyl-L-valyl-L-histidine with an L-prolyl-L-phenylalanine lower alkyl ester in the presence of 1-cyclohexyl-3-morphlinylethyl carbodiimide, splitting off the carbobenzyloxy group from the valyl residue of the resulting hexapeptide ester with hydrogen bromide, then reacting said hexapeptide lower alkyl ester with N-carbobenzyloxy-L-asparaginyl-nitro-L-arginine in the presence of 1-cyclohexyl-3-morphlinylethyl carbodiimide, splitting off with hydrogen in the presence of a palladium catalyst the carbobenzyloxy group from the asparaginyl residue and the nitro group from the arginyl residue of the resulting octapeptide ester and hydrolyzing the ester group of said octapeptide ester by means of caustic soda solution to yield L-asparaginyl-L-arginyl-L-valyl-L-tyrosyl-L-valyl-L-histidyl-L-prolyl-L-phenylalanine.

4. A process for the preparation of octapeptides which comprises reacting N-carbobenzyloxy-L-valyl-L-tyrosine with an L-leucyl-L-histidyl-L-prolyl - L - phenylalanine lower alkyl ester in the presence of 1:3-dicyclohexyl carbodiimide, splitting off the carbobenzyloxy residue from the valyl residue of the resulting hexapeptide ester with hydrogen bromide, then reacting said hexapeptide lower alkyl ester with N-carbobenzyloxy-L-asparaginyl-nitro-L-arginine in the presence of 1-cyclohexyl-3-morphlinylethyl carbodiimide, splitting off with hydrogen in in the presence of a palladium catalyst the carbobenzyloxy group from the asparaginyl residue and the nitro group from the arginyl residue of the resulting octapeptide ester and hydrolyzing the ester group of said octapeptide ester by means of caustic soda solution to yield L - asparaginyl-L-arginyl-L-valyl-L-tyrosyl-L-leucyl-L-histidyl-L-prolyl-L-phenylalanine.

5. A process for the production of octapeptides which comprises reacting N-carbobenzyloxy - L - asparaginyl-nitro-L-arginyl-L-valyl-L-tyrosine, in the presence of 1-cyclohexyl-3-morphlinylethyl carbodiimide, with an L-valyl-L-histidyl-L-prolyl - L - phenylalanine lower alkyl ester, splitting off with hydrogen in the presence of a palladium catalyst the carbobenzyloxy group from the asparaginyl residue and the nitro group from the arginyl residue of the resulting octapeptide ester and hydrolyzing the ester group of said octapeptide ester by means of caustic soda solution to yield L-asparaginyl-L-arginyl-L-valyl-L-tyrosyl-L-valyl - L - histidyl-L-prolyl-L-phenylalanine.

6. A process for the preparation of octapeptides which comprises reacting N-carbobenzyloxy - L - asparaginyl-(Nε-carbobenzyloxy)-L-lysine with an L-valyl-L-tyrosyl-L-leucyl-L-histidyl-L-prolyl-L-phenylalanine lower alkyl ester in the presence of 1-cyclohexyl-3-morphlinylethyl carbodiimide, splitting off the carbobenzyloxy groups from the asparaginyl and lysyl residues of the resulting octapeptide ester and hydrolyzing the ester group of said octapeptide ester by means of caustic soda solution to yield L-asparaginyl-L-lysyl-L-valyl-L-tyrosyl-L-leucyl-L-histidyl-L-prolyl-L-phenylalanine.

7. L-asparaginyl - L - α - amino-(amino lower alkyl)-acetyl-L-α-amino - lower alkyl-acetyl-L-tyrosyl-L-α-amino lower alkyl-acetyl - L - histidyl-L-prolyl-L-phenylalanine lower alkyl esters.

8. L-asparaginyl - L - α - amino-(amino lower alkyl)-acetyl - L - α - amino-lower alkyl-acetyl-L-tyrosyl-L-α-amino lower alkyl-acetyl - L - histidyl-L-prolyl-L-phenylalanine.

9. A member selected from the group consisting of L-asparagyl-L-α-amino - (amino - lower alkyl) - acetyl-L-α-amino lower alkyl - acetyl-L-tyrosyl-L-leucyl-L-histidyl-L-prolyl-L-phenylalanine lower alkyl esters thereof, and acid-addition salts of these compounds.

10. A member selected from the group consisting of L - asparagyl-L-α-amino-(amino-lower alkyl)-acetyl-L-α-amino-lower alkyl - acetyl-L-tyrosyl-L-valyl-L-histidyl-L-prolyl-L-phenylalanine lower alkyl esters thereof, and acid-addition salts of these compounds.

11. L-asparaginyl - L - arginyl - L - valyl-L-tyrosyl-L-valyl-L-histidyl-L-prolyl-L-phenylalanine.

12. L - asparaginyl - L - arginyl-L - valyl-L-tyrosyl-L-isoleucyl-L-histidyl-L-prolyl-L-phenylalanine.

13. L-asparaginyl - L - arginyl - L - leucyl-L-tyrosyl-L-isoleucyl-L-histidyl-L-prolyl-L-phenylalanine.

14. L-asparagyl - L - arginyl - L - valyl-L-tyrosyl-L-valyl-L-histidyl-L-prolyl-L-phenylalanine.

15. L-asparagyl - L - arginyl - L - leucyl-L-tyrosyl-L-isoleucyl-L-histidyl-L-prolyl-L-phenylalanine.

References Cited in the file of this patent

Anson et al.: Advances in Protein Chemistry, vol. 5, pages 1–75, and particularly pages 44, 49, 51 and 62 (1949), Academic Press Inc., pub., N.Y.

Sheehan: J. American Chem. Soc., vol. 77, pp. 1067–68 (1955).

Skeggs et al.: J. Expt. Med., vol. 104 (1956), pp. 193–7.

UNITED STATES PATENT OFFICE
CERTIFICATION OF CORRECTION

Patent No. 2,978,444                                April 4, 1961

Robert Schwyzer et al.

It is hereby certified that error appears in the above numbered patent requiring correction and that the said Letters Patent should read as corrected below.

Columns 5 and 6, Example 6, the right-hand terminal portion of the structural formula should appear as shown below instead of as in the patent:

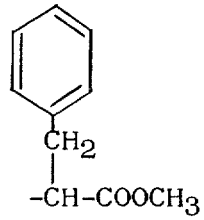

same column 5, line 71, after "gelatine" insert a comma; line 73, after "polyalkylene" strike out the comma; column 6, line 66, and column 10, line 10, for "-propyl-", each occurrence, read -- -prolyl- --; column 12, line 41, after "187° C." insert a a semicolon; line 69, for "bicarbonte" read -- bicarbonate --; column 16, line 14, for "30-25" read -- 20-25 --; column 22, line 74, for "N-carbobenzyloxyl-L-" read -- N-carbobenzyloxy-L- --; column 26, line 17, for "of" read -- or --; column 28, line 64, after "ester", first occurrence, insert -- with hydrogen bromide --; column 29, lines 4 and 9, after "-phenylalanine", each occurrence, insert a comma.

Signed and sealed this 7th day of November 1961.

(SEAL)
Attest:

ERNEST W. SWIDER                               DAVID L. LADD
Attesting Officer                                  Commissioner of Patents